US010757001B2

(12) United States Patent
Omar et al.

(10) Patent No.: US 10,757,001 B2
(45) Date of Patent: Aug. 25, 2020

(54) METHODS FOR DYNAMIC SENSITIVITY CONTROL IN WIRELESS NETWORKS

(71) Applicants: Hassan Omar, Kanata (CA); Ming Jian, Kanata (CA); Taiwen Tang, Nepean (CA)

(72) Inventors: Hassan Omar, Kanata (CA); Ming Jian, Kanata (CA); Taiwen Tang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/986,164

(22) Filed: May 22, 2018

(65) Prior Publication Data

US 2019/0363969 A1    Nov. 28, 2019

(51) Int. Cl.
*H04W 72/04*    (2009.01)
*H04L 12/26*    (2006.01)
*H04W 24/10*    (2009.01)
*H04W 74/08*    (2009.01)

(52) U.S. Cl.
CPC .............. *H04L 43/16* (2013.01); *H04W 24/10* (2013.01); *H04W 74/0816* (2013.01)

(58) Field of Classification Search
CPC ........... H04W 74/0816; H04W 52/241; H04W 72/0473; H04W 84/12; H04W 88/08; H04W 24/10; H04L 43/16
USPC ...................................................... 370/252
See application file for complete search history.

(56) References Cited

U.S. PATENT DOCUMENTS

| 9,854,607 | B1 * | 12/2017 | Chu ..................... H04W 52/241 |
| 10,172,137 | B1 * | 1/2019 | Hedayat ................ H04W 74/02 |
| 2007/0060155 | A1 | 3/2007 | Kahana et al. |
| 2007/0286122 | A1 | 12/2007 | Fonseca |
| 2008/0008133 | A1 | 1/2008 | Zhu et al. |

(Continued)

FOREIGN PATENT DOCUMENTS

| CN | 102769912 A | 11/2012 |
| CN | 106470488 A | 3/2017 |

OTHER PUBLICATIONS

H. A. Omar, K. Abboud, N. Cheng, K. R. Malekshan, A. T. Gamage and W. Zhuang, "A Survey on High Efficiency Wireless Local Area Networks: Next Generation WiFi," in IEEE Communications Surveys & Tutorials, vol. 18, No. 4, pp. 2315-2344, 2016.

(Continued)

*Primary Examiner* — Faisal Choudhury

(57) ABSTRACT

Methods and devices for dynamic sensitivity control (DSC) in wireless networks are provided by adapting a clear channel assessment threshold (CCAT) on a frame-by-frame basis, based on a destination of a head-of-line (HoL) frame in a medium access control (MAC) layer transmission queue. Two different ways of protecting the communication range among devices in a basic serving set (BSS) are disclosed. In the first way, frames received from a node's BSS are differentiated, at the MAC layer, from frames received from an overlapping BSS (OBSS), and different CCATs are used for frames received from the node's BSS versus frames received from OBSS(s). In the second way, a lower bound on the CCAT value is defined based on the average received signal strength indicator (RSSI) of frames previously received from the node's BSS, and the CCAT is periodically reset to its minimum value.

20 Claims, 18 Drawing Sheets

(56) References Cited

U.S. PATENT DOCUMENTS

| | | | | |
|---|---|---|---|---|
| 2014/0126550 | A1* | 5/2014 | Frederiks | H04W 74/085 370/336 |
| 2014/0376453 | A1 | 12/2014 | Smith | |
| 2015/0063327 | A1* | 3/2015 | Barriac | H04W 56/0005 370/337 |
| 2015/0289293 | A1* | 10/2015 | Zhang | H04W 74/002 455/404.1 |
| 2015/0296528 | A1* | 10/2015 | Coffey | H04L 1/0021 370/338 |
| 2016/0353329 | A1 | 12/2016 | Kakani | |
| 2016/0381565 | A1* | 12/2016 | Oteri | H04W 16/14 370/328 |
| 2018/0070353 | A1* | 3/2018 | Yang | H04W 72/0446 |
| 2019/0007971 | A1* | 1/2019 | Yoshimura | H04W 28/06 |
| 2019/0230703 | A1* | 7/2019 | Lv | H04W 52/246 |

OTHER PUBLICATIONS

M. S. Afaqui, E. Garcia-Villegas, E. Lopez-Aguilera and D. Camps-Mur, "Dynamic sensitivity control of access points for IEEE 802.11ax," in Proc. IEEE International Conference on Communications (ICC), p. 1-7, May 2016.

C. K. Chau, I. W. H. Ho, Z. Situ, S. C. Liew and J. Zhang, "Effective Static and Adaptive Carrier Sensing for Dense Wireless CSMA Networks," IEEE Transactions on Mobile Computing, vol. 16, No. 2, pp. 355-366, Feb. 2017.

P. Kulkarni and F. Cao, "Dynamic Sensitivity Control to improve Spatial Reuse in Dense Wireless LANs," In Proc. ACM International Conference on Modeling, Analysis and Simulation of Wireless and Mobile Systems (MSWiM '16), p. 323-329, Nov. 2016.

"Heads We Win, Tails We Don't Lose: Proposals for Dynamic CCA", IEEE Standard 802.11-16/1225r0, Sep. 2016.

Cisco. (2015). "The Zettabyte Era: Trends and Analysis". Cisco White paper. Accessed on Sep. 20, 2015. [Online]. Available: http://www.cisco.com/c/en/us/solutions/collateral/service-provider/visual-networking-index-vni/VNI_Hyperconnectivity_WP.html.

Pass Inc. Press. (2014). "iPass WiFi Growth Map Shows 1 Public Hotspot for Every 20 People on Earth by 2018". [Online]. Available: http://www.ipass.com/press-releases/ipass-wi-fi-growth-map-shows-one-public-hotspot-for-every-20-peopleon-earth-by-2018/.

R. Stacey, "Specification Framework for TGax", IEEE 802.11-15/0132r15, 2016.

E. G-Villegas, M. Afaqui, and E. L-Aguilera, "Drivers of the dynamic CCA adaptation", IEEE Standard 802.11-15/1427-00-00ax, 2015.

IEEE 802.11-14/0872r0 Sean Coffey et al., "A Protocol Framework for Dynamic CCA",dated Jul. 2014,total 16 pages.

* cited by examiner

METHODS FOR DYNAMIC SENSITIVITY CONTROL IN WIRELESS NETWORKS

FIELD

The present disclosure relates generally to wireless communications and, in particular, to dynamic sensitivity control in wireless communication networks and associated methods and apparatus.

BACKGROUND

In wireless communication networks, an electronic device or station (STA), such as a user equipment (UE), may wirelessly communicate with a network node, such as an access point (AP) or base station (BS), to send data to the network node and/or receive data from the network node.

In a wireless network that uses carrier sense multiple access with collision avoidance, CSMA/CA, an electronic device or network node is configured to listen to the wireless medium and only transmit if the medium is found to be not busy. If the wireless medium is busy, the electronic device or network node must wait until the medium is clear before transmitting. This listening process is referred to as a clear channel assessment (CCA) and is a logical function in the physical (PHY) layer that determines the current state of use of the wireless medium so as to avoid transmission collisions in the medium. The CCA logical function may be based on a CCA threshold, whereby a received signal strength in the wireless medium is compared to the CCA threshold and the wireless medium is determined to be "busy" if the received signal strength meets or exceeds the CCA threshold.

CCA is one of two carrier sense mechanisms commonly used in wireless local area networks (WLANs). For example, CCA is defined in the IEEE 802.11-2007 standards, and the subsequent IEEE 802.11 standards, as part of the Physical Medium Dependant (PMD) and Physical Layer Convergence Protocol (PLCP) layer. CCA involves two related functions: Carrier Sense CCA (CS/CCA) and Energy Detect CCA (CCA-ED).

CS/CCA is a CCA mechanism that is based on measuring the signal strength of a detected WiFi physical layer protocol data unit (PPDU), i.e., relates to the capability of the receiver to detect and decode a WLAN preamble. From the PLCP header field, the time duration for which the medium will be occupied can be inferred and when such WLAN preamble is detected the CCA flag is held busy until the end of data transmission.

CCA-ED is a CCA mechanism that is based on measuring the strength of any received signal, including non-WiFi signals and detected/undetected WiFi PPDUs, i.e., relates to the ability of the receiver to detect received energy in the operating channel and back off data transmission. The ED threshold is typically defined to be 20 dB above the minimum Rx sensitivity of the PHY. If the in-band signal energy crosses this threshold, CCA is held busy until the medium energy is below the threshold.

In the IEEE 802.11 standards, for a primary 20 MHz channel, the CS/CCA threshold is equal to −82 dBm, and a CCA-ED threshold is equal to −62 dBm, which in practice means that any valid signal detected at or greater than −82 dBm shall indicate that the medium is busy, and any energy level detected at or greater than −62 dBm shall also indicate that the medium is busy.

An example of a receiving procedure in an AP or STA that uses CS/CCA in accordance with the IEEE 802.11 standard is shown in FIG. 1. The receiving procedure involves medium access control (MAC) layer and PHY layer functions and includes two states: a CS/CCA state and a Receive (RX) state. In the CS/CCA state a received signal strength indicator (RSSI) measurement is performed by the PHY layer. For example, as generally indicated at 100 in FIG. 1, the PHY layer may measure RSSI during the preamble of a received PPDU. If the RSSI measurement is above a CCAT, the PHY layer sends a PHY-CCA indication to the MAC layer, as generally indicated at 102 in FIG. 1, to indicate that the wireless medium is busy. The PHY-CCA indication is effectively an indication to the MAC layer that a received signal, greater than the CCAT has been received, thus indicating that the medium is busy, and causes the received signal to be processed by the PHY later. During the RX state, the processed signal from the PHY layer is passed to the MAC layer as generally indicated at 104 in FIG. 1. Once the PPDU has been received, decoded and passed to the MAC layer, the PHY layer may then perform a subsequent RSSI measurement and, if the subsequent RSSI measurement is below the CCAT, the PHY layer sends a PHY-CCA indication to the MAC layer, as generally indicated at 106 in FIG. 1, to indicate that the wireless medium is idle.

SUMMARY

As noted above, when an AP or STA finds the wireless medium to be busy, i.e., when the PHY layer determines that an RSSI measurement is above the CCAT, the AP or STA avoids transmitting until the PHY layer indicates that the wireless medium is idle. However, having a fixed CCAT may result in a station being prevented from transmitting, i.e., when the PHY layer determines that an RSSI measurement is above the CCAT, even when it could do so without causing any relevant interference to the receiving AP or STA that is intended by the current transmission causing the RSSI measurement to be above the CCAT. In effect, this means that the use of a fixed CCAT may limit the potential total system throughput, because STAs and/or APs that could otherwise transmit simultaneously on the same channel may be prevented from doing so because of the default CCAT. In some cases, the CCAT could simply be set to a higher default value, but doing so potentially has a negative impact on the network coverage area.

Aspects of the present disclosure address the challenges of DSC by providing mechanisms for dynamic adaptation of the CCAT to potentially improve network throughput, without significantly impacting the communication range among APs and STAs.

A first aspect of the present disclosure provides a method for dynamic sensitivity control in a node in a wireless network. The method includes adapting a clear channel assessment threshold (CCAT) on a frame-by-frame basis, based on a destination of a head-of-line (HoL) frame in a medium access control (MAC) layer transmission queue of the node.

In some embodiments of the first aspect of the present disclosure, adapting the CCAT on a frame-by-frame basis includes:
  given the destination of the HoL frame, calculating the CCAT as a function of:
    a signal-to-interference-plus-noise ratio (SINR) threshold required for successful decoding of the HoL frame at the destination, based on a modulation and coding scheme (MCS) selection method used by the node to transmit the HoL frame;

an average received signal strength indicator (RSSI) of frames received by the node from each station included in a basic service set (BSS) of stations associated with the node; and an estimate of a maximum interference level, at the node, that would allow for successful reception of the HoL frame at the destination.

In some embodiments of the first aspect of the present disclosure, adapting a clear channel assessment threshold (CCAT) on a frame-by-frame basis includes, for a HoL frame destined to the $j^{th}$ station, STA j, in the node's BSS, determining the CCAT, $\tau_j$, according to:

$$\tau_j = \min(\max(f_j(r_j), \tau_{min}), \tau_E), j \in \{1, \ldots, N\},$$

where:

$f_j(\bullet)$ is a function that estimates an interference level at the node given an interference level at STA j;

$r_j$ is a maximum interference signal power allowed for successful capturing and decoding of the HoL frame at STA j;

$\tau_{min}$ is a minimum CCAT;

$\tau_E$ is a CCA energy detection (CCA-ED) threshold; and

N is the number of stations in the node's BSS.

In some embodiments of the first aspect of the present disclosure, the maximum interference signal power, $r_j$, allowed for successful capturing and decoding of the HoL frame at STA j is determined according to:

$$r_j = \min(p_j, d_j), j \in \{1, \ldots, N\},$$

where:

$p_j$ is a maximum interference signal power allowed for successful capturing of the HoL frame at STA j; and $d_j$ is a maximum interference signal power allowed for successful decoding of the HoL frame at STA j.

In some embodiments of the first aspect of the present disclosure:

$$p_j = s_j - c, j \in \{1, \ldots, N\}; \text{ and}$$

$$d_j = 10\log_{10}\left(10^{\frac{s_j - t_j}{10}} - 10^{\frac{n}{10}}\right), j \in \{1, \ldots, N\},$$

where:

$s_j$ is an average RSSI (in dBm) of frames received from STA j;

c is a frame capture threshold, defined as the minimum ratio, in dB, between the powers of two received frames required for the receiver to capture the frame with the higher power and discard the frame with the lower power;

$t_j$ is an SINR threshold, in dB, required for successful decoding of the HoL frame by STA j, given the MCS index, $m_j$, that will be used for the transmission of the HoL frame, as determined by an MCS selection method employed by the node; and n is noise power, in dBm.

In some embodiments of the first aspect of the present disclosure, the method further includes:

using the minimum CCAT $\tau_{min}$ as a first CCAT for frames received from the node's BSS; and using the CCAT $\tau_j$ as a second CCAT for frames received from overlapping basic service sets (OBSSs).

In some embodiments of the first aspect of the present disclosure, the method further includes differentiating, at the MAC layer, between frames received from the node's BSS and frames received from the OBSSs.

In some embodiments of the first aspect of the present disclosure, the method further includes, for a frame received from an OBSS:

responsive to determining, at the MAC layer, that the RSSI from the physical (PHY) layer preamble of the frame is below the second CCAT, sending a request to the PHY layer to drop a remaining portion of the frame.

In some embodiments of the first aspect of the present disclosure, the method further includes:

responsive to receiving, at the PHY layer, the request to drop the remaining portion of the frame:

halting, at the PHY layer, reception of the remaining portion of the frame; and sending, from the PHY layer to the MAC layer, a message indicating a channel idle state.

In some embodiments of the first aspect of the present disclosure, the minimum CCAT $\tau_{min}$ is a fixed minimum CCAT, where $\tau_j \geq \tau_{min}$.

In some embodiments of the first aspect of the present disclosure, the method further includes:

i) determining a CCAT value, $\tau$, to be used for an HoL frame destined to the $j^{th}$ STA, as a function of the $\tau_j$ value and the minimum average RSSI, $s_{min}$, received by the node from the N stations in the node's BSS, according to:

$$s_{min} = \min_{i=1,\ldots,N} s_i$$

$$\tau = \min(\tau_j, s_{min}), j \in \{1, \ldots, N\}; \text{ and}$$

ii) periodically resetting the CCAT value, $\tau$, to the minimum CCAT $\tau_{min}$.

A second aspect of the present disclosure provides a network node that includes one or more processors and a non-transitory computer readable storage medium storing programming for execution by the one or more processors. The programming includes instructions to adapt a clear channel assessment threshold (CCAT) on a frame-by-frame basis, based on a destination of a head-of-line (HoL) frame in a medium access control (MAC) layer transmission queue of the node.

In some embodiments of the second aspect of the present disclosure, the programming includes instructions to adapt the CCAT on a frame-by-frame basis by calculating the CCAT as a function of:

a signal-to-interference-plus-noise ratio (SINR) threshold required for successful decoding of the HoL frame at the destination, based on a modulation and coding scheme (MCS) selection method used by the node to transmit the HoL frame;

an average received signal strength indicator (RSSI) of frames received by the node from each station included in a basic service set (BSS) of stations associated with the node; and an estimate of a maximum interference level, at the node, that would allow for successful reception of the HoL frame at the destination.

In some embodiments of the second aspect of the present disclosure, the programming includes instructions to adapt the CCAT on a frame-by-frame basis by:

for a HoL frame destined to the $j^{th}$ station, STA j, in the node's BSS, determining the CCAT, $\tau_j$, according to:

$$\tau_j = \min(\max(f_j(r_j), \tau_{min}), \tau_E), j \in \{1, \ldots, N\},$$

where:

$f_j(\bullet)$ is a function that estimates an interference level at the node given an interference level at STA j;

$r_j$ is a maximum interference signal power allowed for successful capturing and decoding of the HoL frame at STA j;

$\tau_{min}$ is a minimum CCAT;
$\tau_E$ is a CCA energy detection (CCA-ED) threshold; and
N is the number of stations in the node's BSS.

In some embodiments of the second aspect of the present disclosure, the programming includes instructions to determine the maximum interference signal power, $r_j$, allowed for successful capturing and decoding of the HoL frame at STA j according to:

$$r_j = \min(p_j, d_j), j \in \{1, \ldots, N\},$$

where:
$p_j$ is a maximum interference signal power allowed for successful capturing of the HoL frame at STA j; and
$d_j$ is a maximum interference signal power allowed for successful decoding of the HoL frame at STA j.

In some embodiments of the second aspect of the present disclosure:

$$p_j = s_j - c, \; j \in \{1, \ldots, N\}; \text{ and}$$

$$d_j = 10\log_{10}\left(10^{\frac{s_j - t_j}{10}} - 10^{\frac{n}{10}}\right), \; j \in \{1, \ldots, N\},$$

where:
$s_j$ is an average RSSI (in dBm) of frames received from STA j;
c is a frame capture threshold, defined as the minimum ratio, in dB, between the powers of two received frames required for the receiver to capture the frame with the higher power and discard the frame with the lower power;
$t_j$ is an SINR threshold, in dB, required for successful decoding of the HoL frame by STA j, given the MCS index, $m_j$, that will be used for the transmission of the HoL frame, as determined by an MCS selection method employed by the node; and
n is noise power, in dBm.

In some embodiments of the second aspect of the present disclosure, the programming includes instructions to:
use the minimum CCAT $\tau_{min}$ as a first CCAT for frames received from the node's BSS; and
use the CCAT $\tau_j$ as a second CCAT for frames received from overlapping basic service sets (OBSSs).

In some embodiments of the second aspect of the present disclosure, the programming includes instructions to:
differentiate, at the MAC layer, between frames received from the node's BSS and frames received from the OBSSs.

In some embodiments of the second aspect of the present disclosure, the programming includes instructions to:
for a frame received from an OBSS, responsive to determining, at the MAC layer, that the RSSI from the physical (PHY) layer preamble of the frame is below the second CCAT, send a request to the PHY layer to drop a remaining portion of the frame.

In some embodiments of the second aspect of the present disclosure, the programming includes instructions to:
responsive to receiving, at the PHY layer, the request to drop the remaining portion of the frame:
halt, at the PHY layer, reception of the remaining portion of the frame;
and send, from the PHY layer to the MAC layer, a message indicating a channel idle state.

In some embodiments of the second aspect of the present disclosure, the minimum CCAT $\tau_{min}$ is a fixed minimum CCAT, where $\tau_j \geq \tau_{min}$.

In some embodiments of the second aspect of the present disclosure, the programming includes instructions to:
i) determine a CCAT value, $\tau$, to be used for an HoL frame destined to the $j^{th}$ STA, as a function of the $\tau_j$ value and the minimum average RSSI, $s_{min}$, received by the node from the N stations in the node's BSS, according to:

$$s_{min} = \min_{i=1,\ldots,N} s_i$$

$$\tau = \min(\tau_j, s_{min}), j \in \{1, \ldots, N\}; \text{ and}$$

ii) periodically reset the CCAT value, $\tau$, to the minimum CCAT $\tau_{min}$.

These and other aspects and features of the present disclosure will now become apparent to those of ordinary skill in the art upon review of the following description of specific embodiments of the disclosure in conjunction with the accompanying drawings.

BRIEF DESCRIPTION OF THE DRAWINGS

Embodiments of the present disclosure will be described in greater detail with reference to the accompanying drawings.

DETAILED DESCRIPTION

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

As noted above, aspects of this disclosure provide mechanisms for dynamic sensitivity control to dynamically adapt a Carrier Sense CCA (CS/CCA) threshold (CCAT). However, before discussing specific example embodiments, potential trade-offs related to increasing or decreasing the CCAT will be discussed with reference to FIGS. 2 to 5. Such trade-offs may include an exposed terminal problem, carrier sensing range and a hidden terminal problem.

Figure 1:
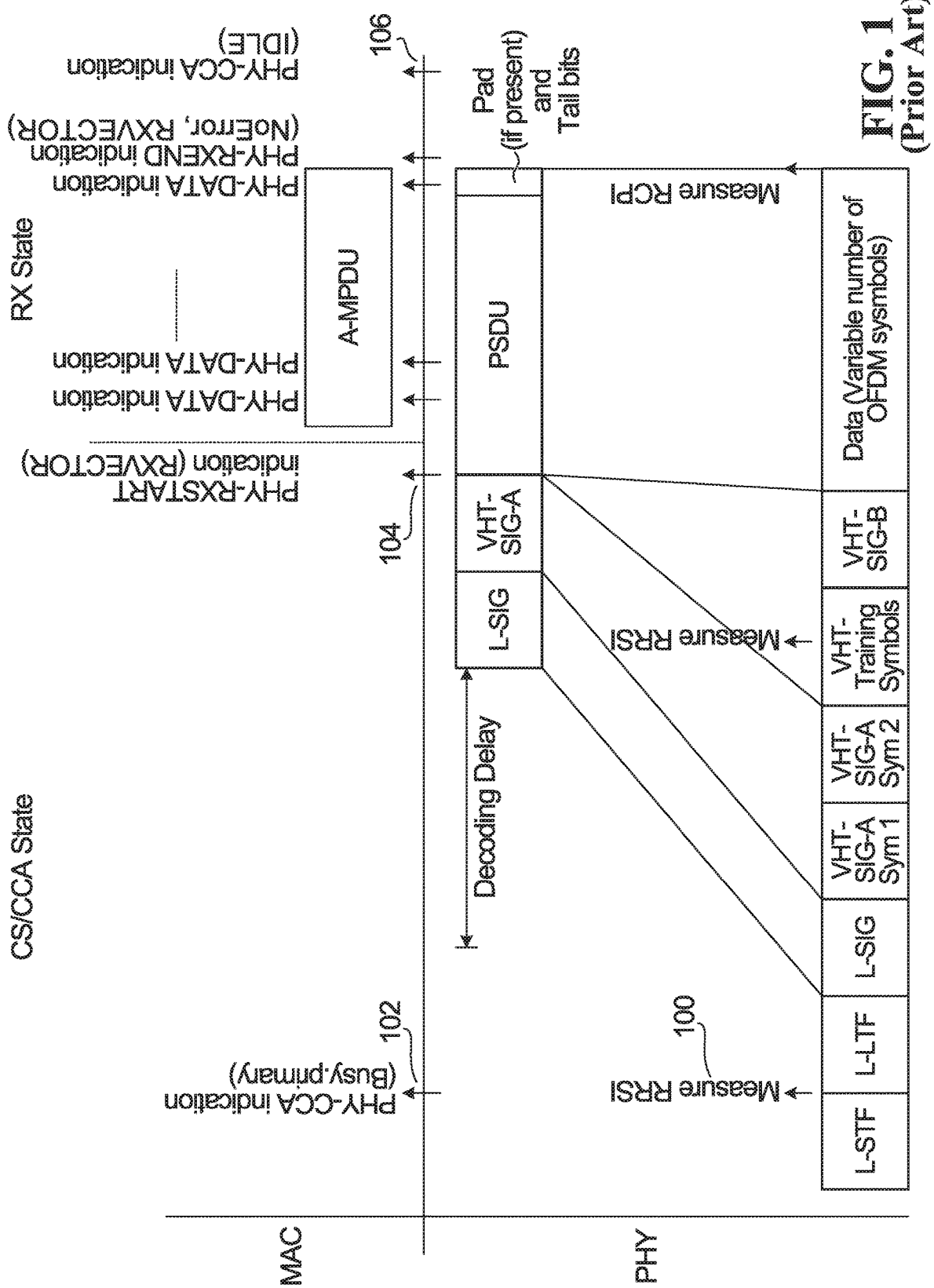
FIG. 1 is a diagram of a receiving procedure in an AP or STA that uses CSMA/CA according to the IEEE 802.11 standard.
Figures 2A, 2B:
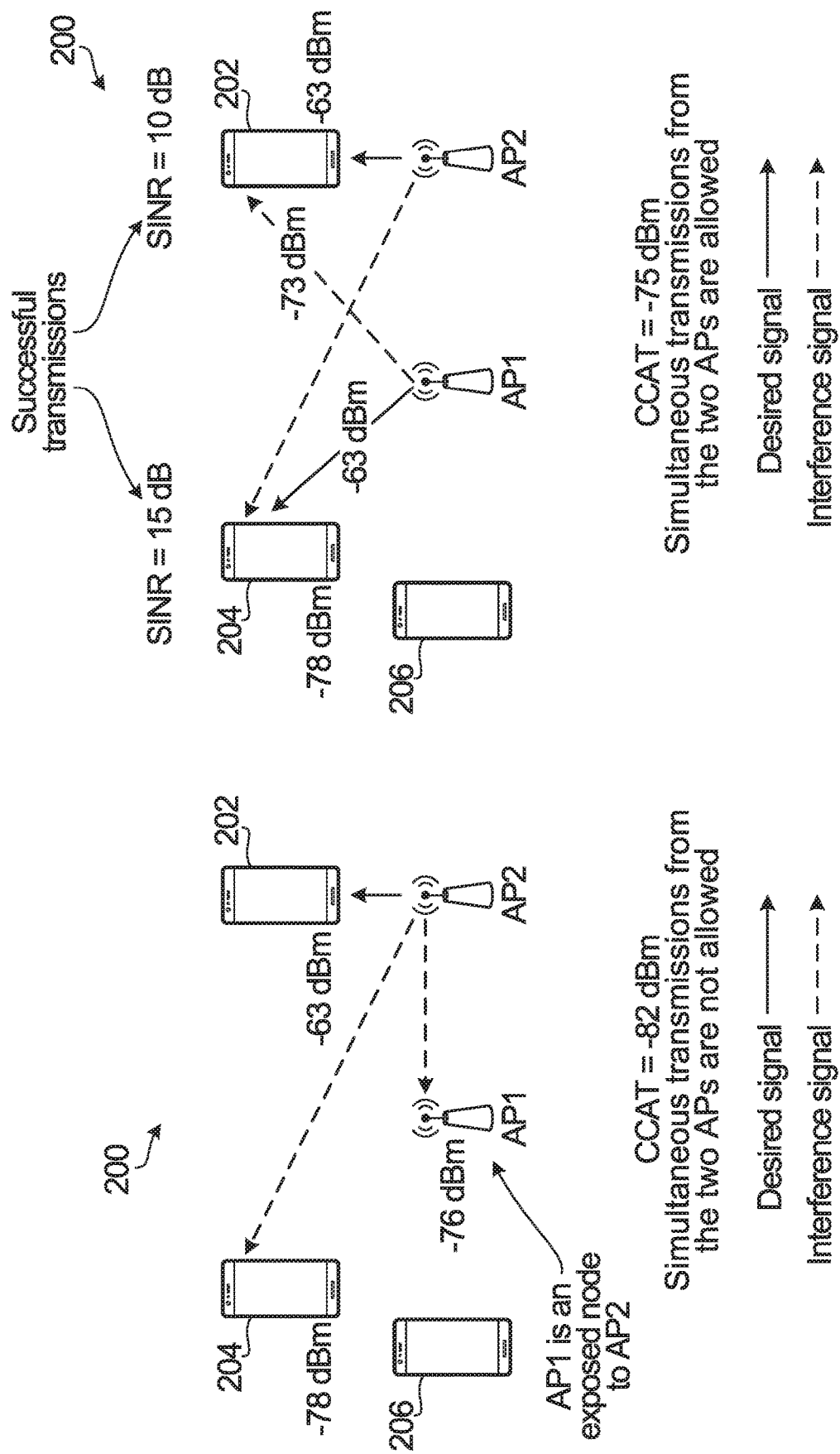
FIGS. 2A and 2B are diagrams of a wireless communications network that show how increasing the CCAT can reduce the effect of the exposed terminal problem.

For example, FIGS. 2A and 2B are diagrams of a wireless communications network 200 that show how increasing the CCAT can reduce the effect of the exposed terminal problem, whereby a first terminal or node is effectively prevented from transmitting by exposure to a transmission from a second terminal or node that is received at the first terminal or node with an RSSI above its CCAT. The wireless communications network 200 includes two APs AP1 and AP2 and three electronic devices or STAs 202, 204, 206. In FIG. 2A, the CCAT of AP1 is set to the standard −82 dBm CCAT defined in the IEEE 802.11 standard. AP1 is an exposed node or terminal to AP2. In the moment depicted in FIG. 2A, AP2 is transmitting to STA 202. The signal transmitted by AP2 is received at the intended recipient STA 202 with an RSSI of −63 dBm, but it is also received at STA 204 and AP1 with RSSIs of −78 dBm and −76 dBm, respectively. In this case, because the RSSI of the interference signal received at AP1 is greater than the CCAT of AP1, this means that AP1 is effectively prevented from transmitting while AP2 transmits. However, if the CCAT of AP1 is increased to −75 dBm, as shown in FIG. 2B, then the RSSI of −76 dBm for the interference signal received at AP1 from AP2's transmission to STA 202 would not be greater than the CCAT of AP1, which means that AP1 would be free to simultaneously transmit to STA 204 while AP2 transmits to STA 202. In this example, the respective transmissions to STA 202 and STA 204 by AP2 and AP1 are successfully received because the SINR of the desired signal relative to the interference signal at the respective STA is sufficiently high to allow successful reception and decoding of the desired signal. As such, it can be seen from FIGS. 2A and 2B that increasing the CCAT can potentially reduce the exposed node problem.

Figures 3A, 3B:
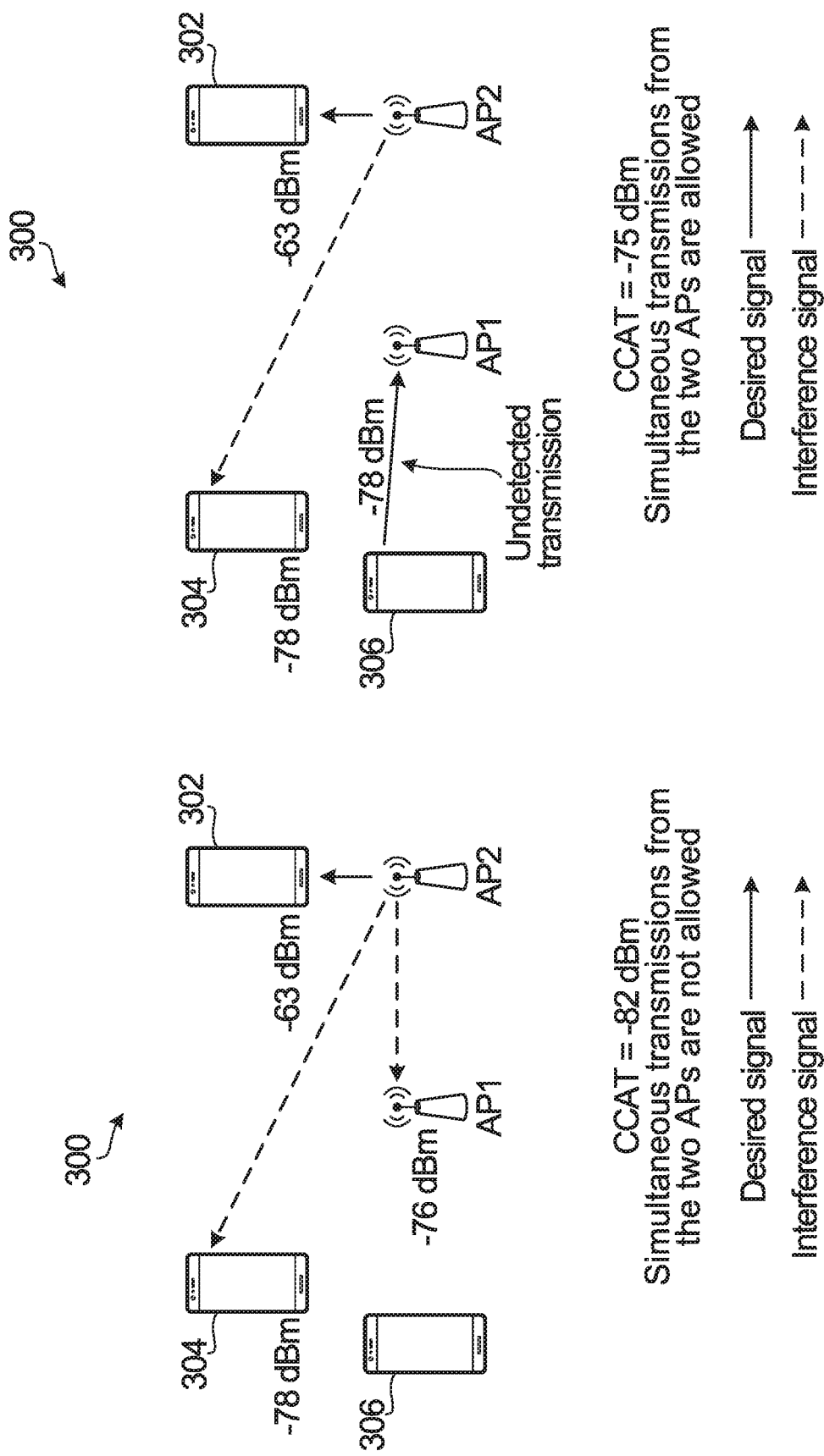
FIGS. 3A and 3B are diagrams of a wireless communications network that show how increasing the CCAT can reduce the carrier sensing range.

However, increasing the CCAT also potentially has a negative impact on carrier sensing range, which may affect communication between an AP and a STA. For example, FIGS. 3A and 3B are diagrams of a wireless communications network 300 that show how increasing the CCAT can reduce carrier sensing range. The wireless communications network 300 includes two APs AP1 and AP2 and three electronic devices or STAs 302, 304, 306. In FIG. 3A, the CCAT of AP1 is set to the standard −82 dBm CCAT defined in the IEEE 802.11 standard. AP1 is an exposed node or terminal to AP2. In the moment depicted in FIG. 3A, AP2 is transmitting to STA 302. The signal transmitted by AP2 is received at the intended recipient STA 302 with an RSSI of −63 dBm, but it is also received at STA 304 and AP1 with RSSIs of −78 dBm and −76 dBm, respectively, which means that AP1 is effectively prevented from transmitting while AP2 transmits. However, if the CCAT of AP1 is increased to −75 dBm, as shown in FIG. 2B, then the RSSI of −76 dBm for the interference signal received at AP1 from AP2's transmission to STA 202 would not be greater than the CCAT of AP1, which means that AP1 would be free to simultaneously access the channel while AP2 transmits to STA 202. However, it also means that any transmission from an STA that is received at AP1 with an RSSI that is less than −75 dBm will not be detected by AP1. For example, in FIG. 3B, a transmission from STA 306 to AP1, which is received at AP1 with an RSSI of −78 dBm, and thus would have been detected when the CCAT of AP1 was set to −82 dBm, goes undetected by AP1 because the CCAT of AP1 has been increased to −75 dBm. As such, it can be seen from FIGS. 3A and 3B that increasing the CCAT can potentially reduce the exposed node problem, but that doing so may reduce the carrier sensing range of the receiver.

Figures 4A, 4B:
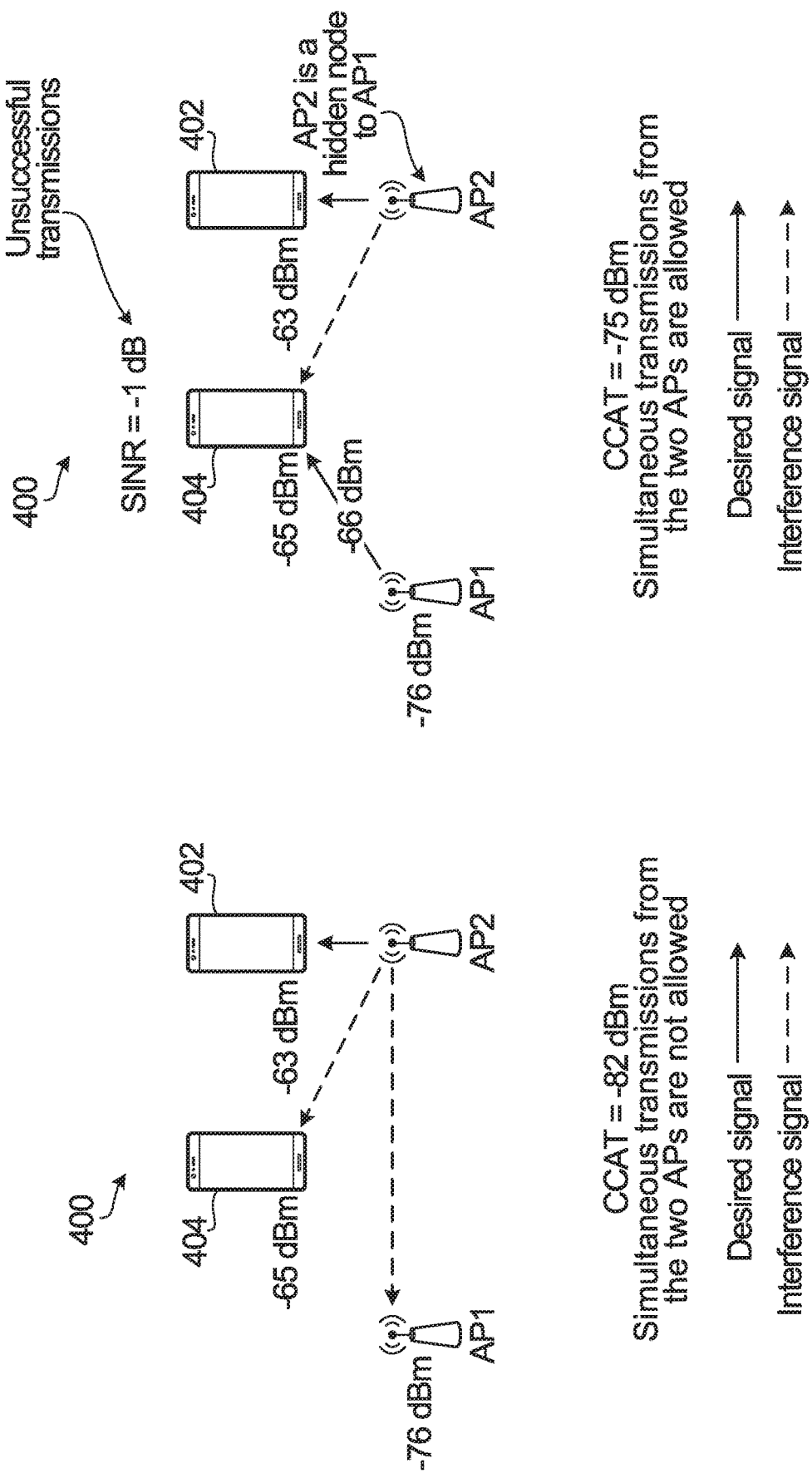
FIGS. 4A and 4B are diagrams of a wireless communications network that show how increasing the CCAT can increase the effect of the hidden terminal problem.

Furthermore, increasing the CCAT also potentially has a negative impact on the hidden terminal problem, which may result in unsuccessful transmissions. For example, FIGS. 4A and 4B are diagrams of a wireless communications network 400 that show how increasing the CCAT can increase the effect of the hidden terminal problem. The wireless communications network 400 includes two APs AP1 and AP2 and two electronic devices or STAs 402 and 404. In FIG. 4A, the CCAT of AP1 is set to the standard −82 dBm CCAT defined in the IEEE 802.11 standard. AP1 is an exposed node or terminal to AP2. In the moment depicted in FIG. 4A, AP2 is transmitting to STA 402. The signal transmitted by AP2 is received at the intended recipient STA 402 with an RSSI of −63 dBm, but it is also received at STA 404 and AP1 with RSSIs of −65 dBm and −76 dBm, respectively. In this case, because the RSSI of the interference signal received at AP1 is greater than the CCAT of AP1, AP1 is effectively prevented from transmitting while AP2 transmits. However, if the CCAT of AP1 is increased to −75 dBm, as shown in FIG. 4B, then the RSSI of −76 dBm for the interference signal received at AP1 from AP2's transmission to STA 402 would not be greater than the CCAT of AP1, which means that AP1 would be free to simultaneously transmit to STA 404 while AP2 transmits to STA 402. Therefore, by increasing AP1's CCAT to −75 dBm, AP2 effectively becomes "hidden" to AP1, in that AP1 does not "see" AP2 because AP2's transmissions are received with RSSIs lower than AP1's CCAT. However, in this example, AP1's transmission to STA 404 by AP1 is not received successfully because the SINR of the desired signal from AP1 relative to the interference signal from AP2 at the STA 404 is −1 dBm which is insufficient to allow successful reception and decoding of the desired signal. As such, it can be seen from FIGS. 4A and 4B that while increasing the CCAT can potentially reduce the exposed node problem, it may also increase the hidden node problem.

Figure 5:
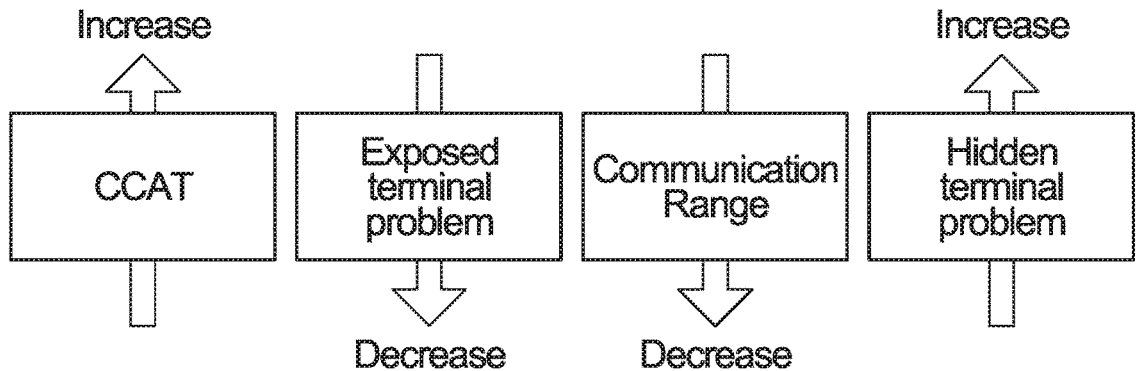
FIG. 5 is a graphical representation of the potential trade-offs in the exposed terminal problem, the carrier sensing range, and the hidden terminal problem by increasing or decreasing the CCAT.

FIG. 5 depicts graphically the potential trade-offs in the exposed terminal problem, the carrier sensing range, and the hidden terminal problem by increasing or decreasing the CCAT. In particular, increasing CCAT decreases the exposed terminal/node problem, but also decreases carrier sensing or communication range and increases the hidden terminal problem. Conversely, decreasing the CCAT increase the exposed terminal problem, but increases the carrier sensing or communication range and decreases the hidden terminal problem.

Aspects of this disclosure provide mechanisms to dynamically adapt a CCAT in a manner that is intended to strike an effective balance between the foregoing trade-offs in order to potentially increase throughput while also protecting carrier sensing or communication range. For example, in accordance with a first aspect of the present disclosure the CCAT is adapted on a frame-by-frame basis, based on the destination of the head-of-line (HoL) frame in the MAC layer queue. Given the destination of the HoL frame, the CCAT is calculated as a function of:
  The SINR threshold required for successful decoding of the HoL frame, based on the MCS that the AP decides to use for the HoL frame transmission
  The average RSSI of the frames received by the AP from each of its BSS STA members
  An estimation function that estimates the maximum interference level at the AP allowed for successful reception of the HoL frame.

Additional aspects of the present disclosure protect the communication range between an AP and each STA in its BSS in two different ways. According to the first way, frames received from the AP's BSS or from an overlapping BSS (OBSS) are differentiated at the MAC layer of the AP, and a first CCAT is used for the frames received from the AP's BSS and a second different CCAT is used for the frames received from OBSSs. For example, a higher CCAT may be used for frames received from OBSSs, while a lower CCAT, such as the standard −82 dBm CCAT defined in the IEEE 802.11 standard, may be used for frames received from the AP's BSS. According to the second way, a lower bound on the CCAT value is defined based on the average RSSI of frames previously received by the AP from its BSS STA members, and the CCAT is periodically reset to its minimum value (e.g., the −82 dBm CCAT value defined in the IEEE 802.11 standard) at predetermined time intervals.

Turning now to FIGS. 6 to 19, some specific example embodiments will be described.

Figure 6:
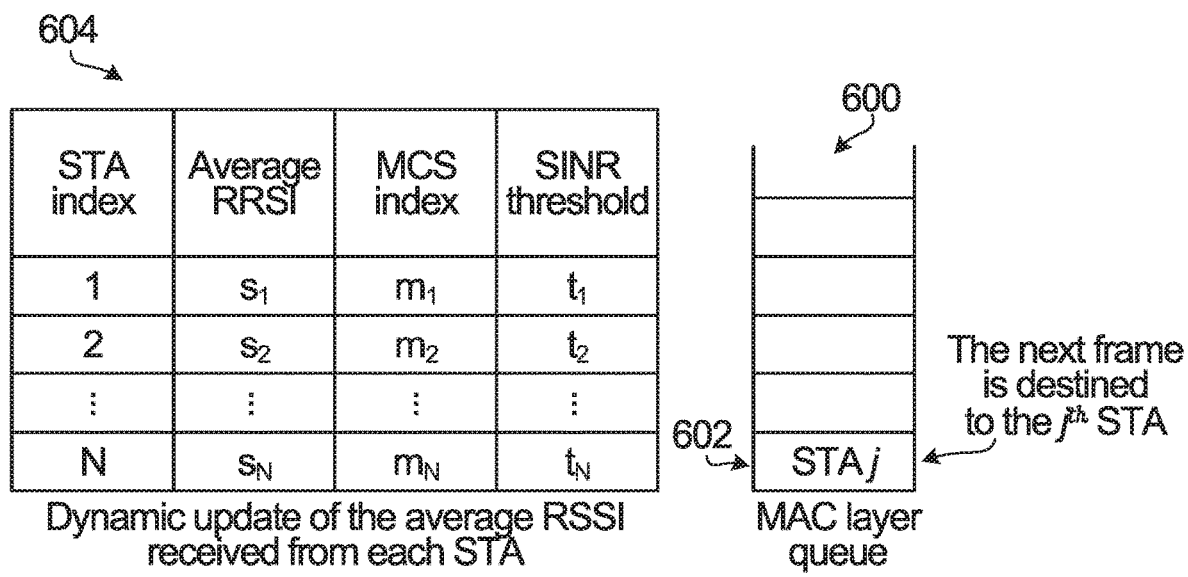
FIG. 6 illustrates a table showing an example of a MAC layer transmission queue and a table for tracking average RSSI, modulation and coding scheme (MCS) index and signal-to-interference-plus-noise ratio (SINR) threshold for multiple STAs in accordance with an embodiment of the present disclosure.

FIG. 6 illustrates a table showing an example of a MAC layer transmission queue 600 of an AP and a table 604 for dynamically updating the average RSSI received from each STA member of the AP's BSS, the MCS index that will be used for the next transmission to each STA member of the AP's BSS (based on an MCS selection scheme employed by the AP), and the SINR threshold required for successful decoding of a frame transmitted using the indicated MCS indices, in accordance with an embodiment of the present disclosure. As shown in FIG. 6, the HoL frame 602 in the MAC layer queue 600 is destined to the $j^{th}$ STA in the AP's BSS. In some embodiments, for a HoL frame destined to the $j^{th}$ station, STA j, in the node's BSS, the CCAT, $\tau_j$, is determined according to:

$$\tau_j = \min(\max(f_j(r_j), \tau_{min}), \tau_E), j \in \{1, \ldots, N\},$$

where:
  $f_j(\cdot)$ is a function that estimates an interference level at the node given an interference level at STA j;
  $r_j$ is a maximum interference signal power allowed for successful capturing and decoding of the HoL frame at STA j;
  $\tau_{min}$ is a minimum CCAT (e.g., the −82 dBm CCAT value defined in the IEEE 802.11 standard);
  $\tau_E$ is a CCA energy detection (CCA-ED) threshold (e.g., the −62 dBm CCA-ED value defined in the IEEE 802.11 standard); and
  N is the number of stations in the node's BSS.

In some embodiments, the maximum interference signal power, $r_j$, allowed for successful capturing and decoding of the HoL frame at STA j is determined according to:

$$r_j = \min(p_j, d_j), j \in \{1, \ldots, N\},$$

where:
  $p_j$ is a maximum interference signal power allowed for successful capturing of the HoL frame at STA j; and
  $d_j$ is a maximum interference signal power allowed for successful decoding of the HoL frame at STA j.
wherein:

$$p_j = s_j - c, j \in \{1, \ldots, N\}; \text{ and}$$

-continued $$d_j = 10\log_{10}\left(10^{\frac{s_j-t_j}{10}} - 10^{\frac{n}{10}}\right), j \in \{1, \ldots, N\},$$

where:

$s_j$ is an average RSSI (in dBm) of frames received from STA j;

c is a frame capture threshold, defined as the minimum ratio (in dB) between the powers of two received frames required for the receiver to capture the frame with the higher power and discard the one with the lower power;

$t_j$ is an SINR threshold (in dB) required for successful decoding of the HoL frame by STA j; and n is noise power (in dBm).

Figure 7:
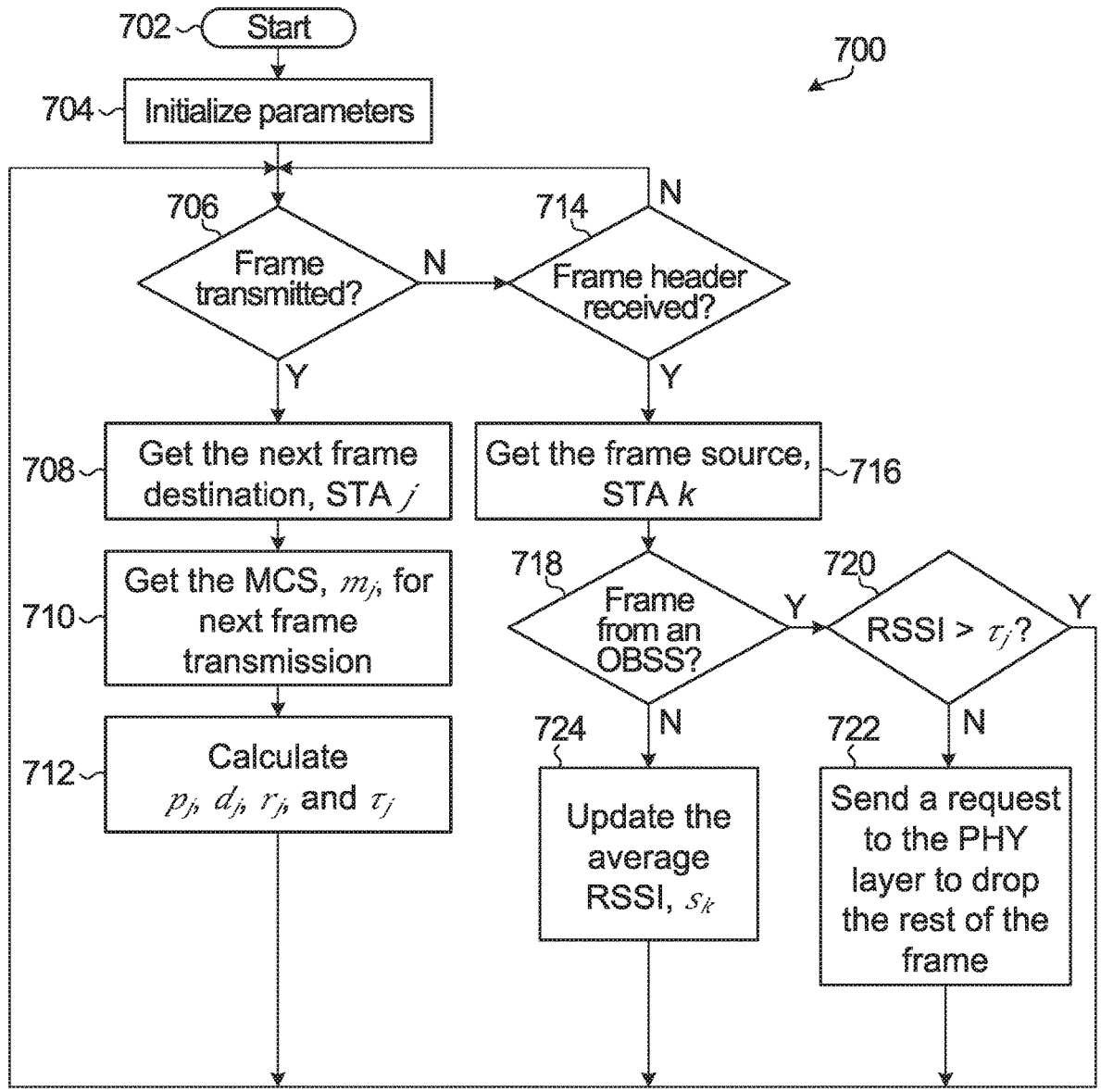
FIG. 7 is a flow diagram of example operations in the MAC layer of an AP in accordance with a first embodiment of the present disclosure.

As noted above, aspects of the present disclosure protect the communication range between an AP and each STA in its BSS in two different ways. FIG. 7 is a flow diagram of example operations 700 in the MAC layer of an AP in accordance with the first of these ways, in which differentiation of BSS and OBSS frames is done at the MAC layer and two different CCAT values are used for BSS and OBSS frames, respectively.

Example operations 700 start at 702 and proceed to 704, in which parameters, such as the capture threshold, c, noise power, n, minimum CCAT, $\tau_{min}$, CCA ED threshold, $\tau_E$, and any initialization necessary to build and update table 604, are initialized. From 704, the operations proceed to 706, in which it is determined whether or not a frame has been transmitted. If it is determined at 706 that a frame has been transmitted (Y path), operations 700 proceed to 708, in which the destination of the new HoL frame in the MAC queue is determined. From 708, operations 700 proceed to 710 in which the MCS, $m_j$ for the new HoL frame is determined. For example, the AP may determine the MCS that will be used for the next transmission to a certain STA based on an adaptive MCS selection method that the AP is employing. The MCS selection method employed by an AP may not be adaptive. For example, in some embodiments, an AP may employ a fixed MCS selection method. Details of specific MCS selection methods are out-of-scope of the present disclosure, and therefore will not be discussed in further detail. From 710, operations 700 proceed to 712, in which $p_j$, $d_j$, $r_j$, and $\tau_j$ are calculated and operations 700 then return to 706. Alternatively, if it is determined at 706 that a frame has not been transmitted (N path), operations 700 proceed to 714, in which it is determined whether or not a frame header has been received. If it is determined at 714 that a frame header has not been received (N path), operations 700 return to 706. Alternatively, if it is determined at 714 that a frame header has been received (Y path), operations 700 proceed to 716 in which the frame source, STA k, is determined based on the received frame header, and operations proceed to 718. At 718, it is determined whether the received frame header is for a frame from an OBSS. If it is determined at 718 that the received frame header is not for a frame from an OBSS (N path), operations 700 proceed to 724 in which the average RSSI for STA k (the received frame source) is updated and then operations 700 return to 706. Alternatively, if it is determined at 718 that the received frame header is for a frame from an OBSS (Y path), operations 700 proceed to 720, where it is determined whether the RSSI of the received frame header is greater than $\tau_j$. If it is determined at 720 that the RSSI is not greater than $\tau_j$ (N path), operations 700 proceed to 722 in which the MAC layer sends a request to the PHY later to drop the rest of the frame. Alternatively, if it is determined at 720 that the RSSI is greater than $\tau_j$ (Y Path), operations 700 return to 706 and processing of the received frame continues at the PHY layer. In other words, $\tau_j$ serves as the CCAT value for OBSS frames in this embodiment.

The example operations 700 are illustrative of an example embodiment. Various ways to perform the illustrated operations, as well as examples of other operations that may be performed, are described herein. Further variations may be or become apparent.

Figure 8:
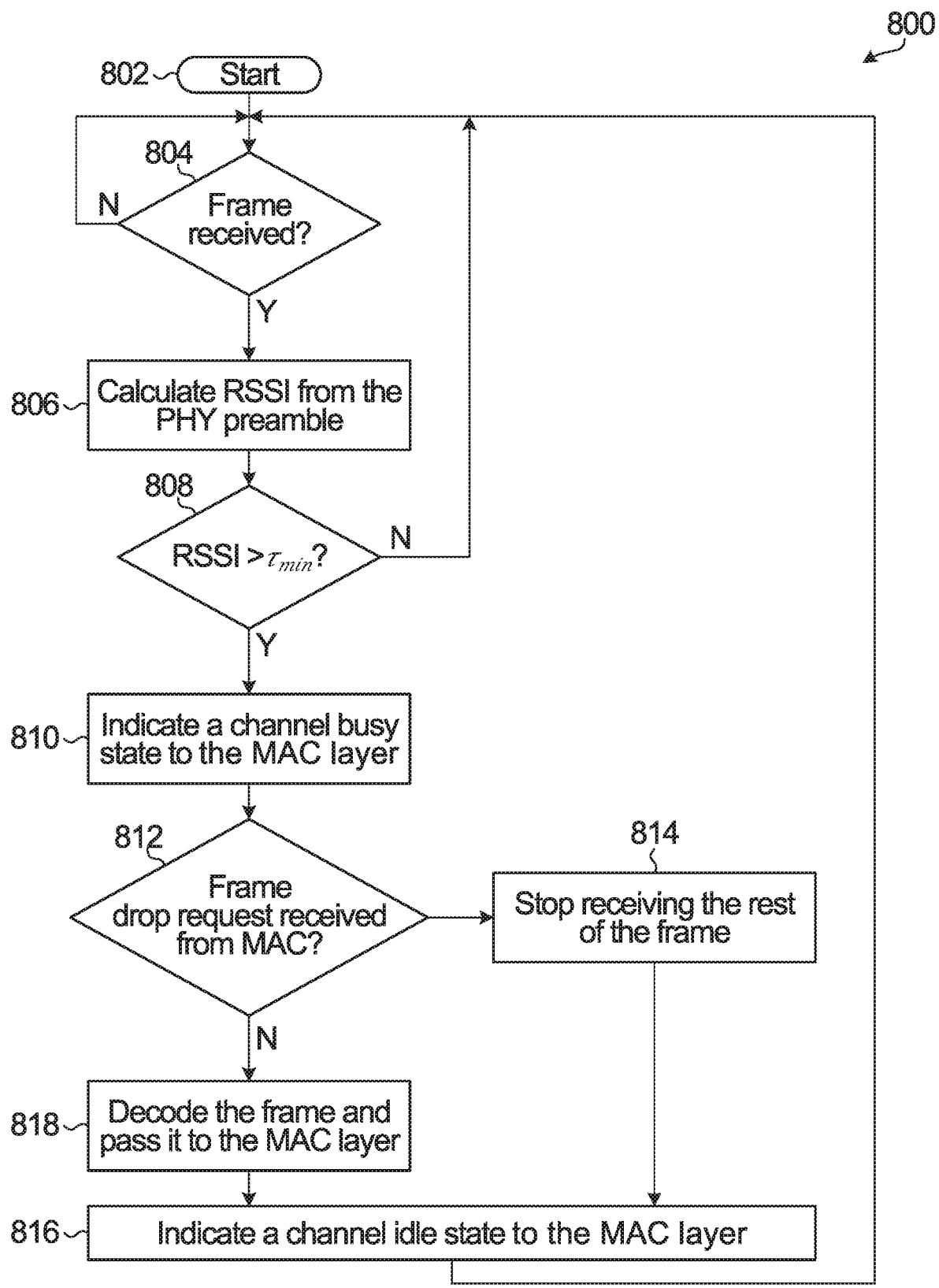
FIG. 8 is a flow diagram of example operations in the PHY layer of an AP in accordance with the first embodiment of the present disclosure.

FIG. 8 is a flow diagram of example operations 800 in the PHY layer of an AP in accordance with the first way to protect the communication range between an AP and each STA in its BSS disclosed in the present disclosure.

Example operations 800 start at 802 and proceed to 804, in which it is determined whether or not a frame has been received. If it is determined at 804 that a frame has not been received (N Path), operations 800 return to 804. Alternatively, if it is determined at 804 that a frame has been received (Y path), operations 800 proceed to 806, in which the RSSI is calculated from the PHY preamble of the received frame. From 806, operations 800 proceed to 808 in which it is determined whether the RSSI of the received frame header is greater than $\tau_{min}$. If it is determined at 808 that the RSSI is not greater than $\tau_{min}$ (N path), operations 800 return to 804. Alternatively, if it is determined at 808 that the RSSI is greater than $\tau_{min}$ (Y Path), operations 800 proceed to 810, in which the PHY layer indicates a channel busy state to the MAC layer and operations 800 proceed to 812. At 812, it is determined whether or not a frame drop request has been received from the MAC layer. If it is determined at 812 that a frame drop request has been received from the MAC layer (Y path), operations 800 proceed to 814, in which the PHY layer stops receiving the rest of the frame and operations 800 proceed to 816. Alternatively, if it is determined at 812 that a frame drop request has not been received from the MAC layer (N path), operations 800 proceed to 818, in which the PHY layer decodes the frame, passes it to the MAC layer, and then proceeds to 816. At 816, the PHY layer indicates a channel idle state to the MAC layer and operations 800 return to 804. From this embodiment, it can be seen that the minimum CCAT, $\tau_{min}$, serves as the CCAT value for frames received from an AP's BSS STA members in this embodiment.

The example operations 800 are illustrative of an example embodiment. Various ways to perform the illustrated operations, as well as examples of other operations that may be performed, are described herein. Further variations may be or become apparent.

Figure 9:
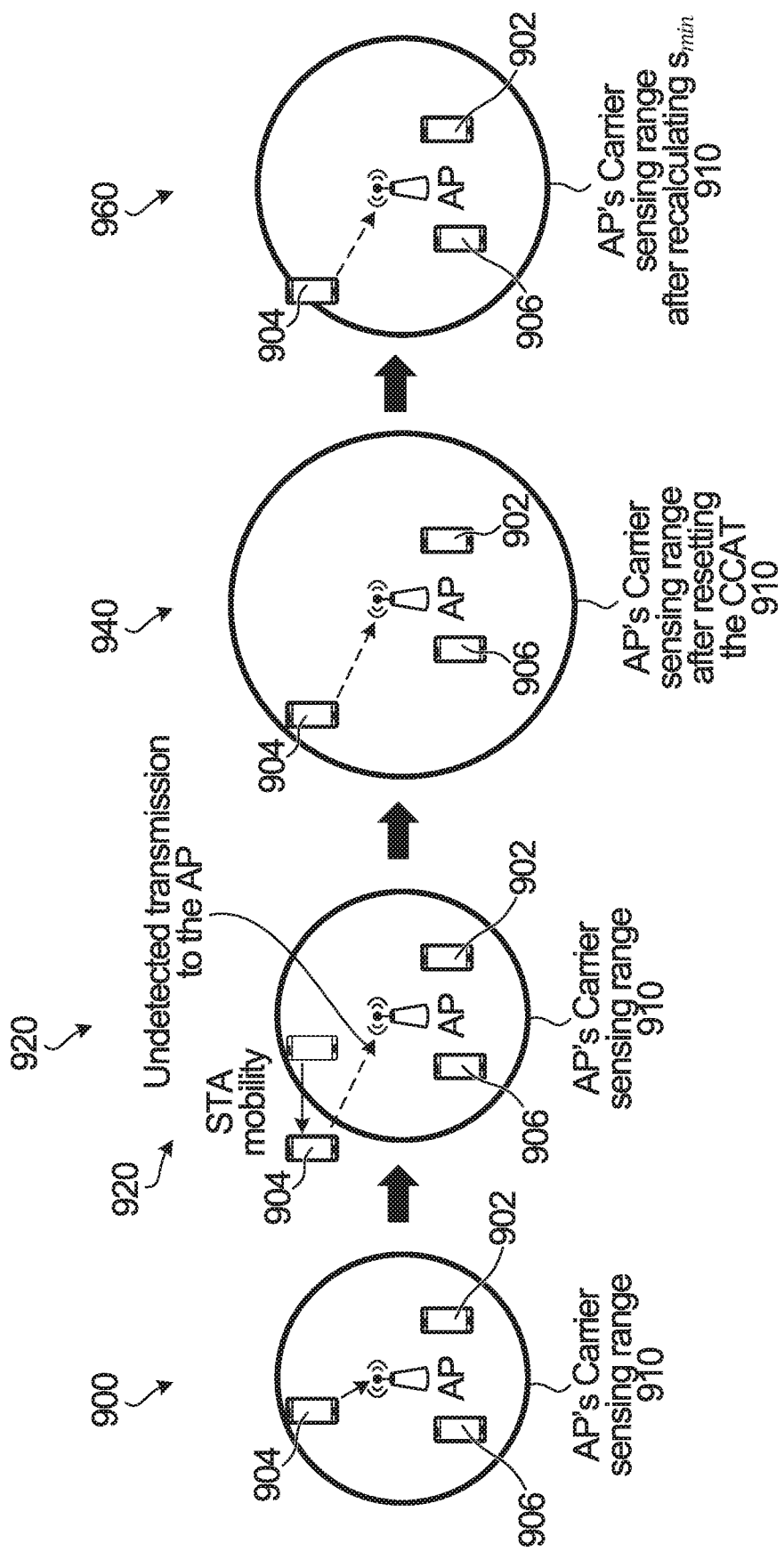
FIG. 9 shows a wireless communications network at different points in time as the CCAT is periodically reset to a minimum CCAT in accordance with a second embodiment of the present disclosure.

FIG. 9 shows a wireless communications network at different points in time as the CCAT of an AP is adapted in accordance with a lower bound based on the average RSSI of frames previously received by the AP from its BSS STA members and periodically reset to a minimum CCAT in accordance with an embodiment of the second way to protect the communication range between an AP and each STA in its BSS disclosed in the present disclosure.

The wireless communications network includes an AP and three STAs 902, 904, 906. At the first instant 900, the AP's carrier sensing range 910 encompasses the three STAs 902, 904, 906. In particular, at the first instant 900 the second STA 904 is shown as transmitting a signal that is received by the AP. At the second instant 920, the second STA 904 has moved outside of the carrier sensing range 910 of the AP, so that a transmission from STA 904 is undetected by the AP. However, as shown at the third instant 940, which is after the CCAT of the AP has been reset to a minimum CCAT, the AP's carrier sensing range 910 has correspondingly increased (due to the lower reset CCAT) and the AP is again able to detect a transmission from the second STA 904. Sometime later, at instant 960, which is after the AP has recalculated the minimum average RSSI, $s_{min}$ received by the AP from its BSS member STAs, where $$s_{min} = \min_{i=1,\ldots,N} s_i, \text{ and}$$

the CCAT value is adapted to a value $\tau$ according to:

$$\tau = \min(\tau_j, s_{min}), j \in \{1, \ldots, N\}.$$

As shown at instant 960, after the CCAT value has been set to $\tau$, the AP's carrier sensing range 910 is reduced, but still encompasses the second STA 904, because the recalculated $s_{min}$ includes the RSSI of the last transmission from STA 904. Therefore, by increasing the CCAT value based on the minimum average RSSI received by the AP from its BSS member STAs, the effect of the exposed terminal problem can be reduced, but the carrier sensing range of the AP is periodically enlarged by resetting the CCAT value in order to protect the communication range and mitigate the hidden terminal problem.

Figure 10:
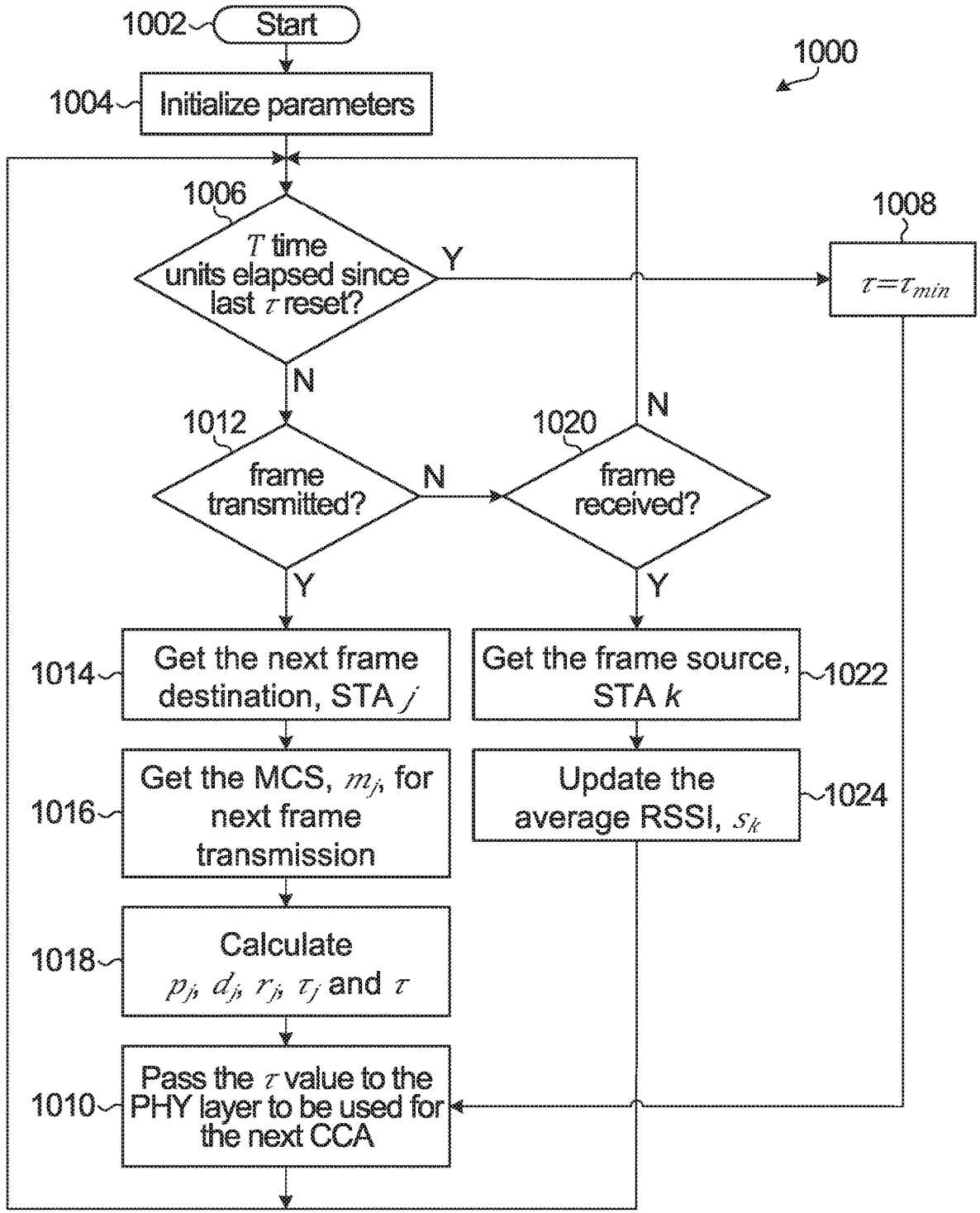
FIG. 10 is a flow diagram of example operations in the MAC layer of an AP in accordance with the second embodiment of the present disclosure.

FIG. 10 is a flow diagram of example operations 1000 in the MAC layer of an AP in accordance with the second way to protect the communication range between an AP and each STA in its BSS disclosed in the present disclosure.

Example operations 1000 start at 1002 and proceed to 1004, in which parameters, such as the capture threshold, c, noise power, n, minimum CCAT, $\tau_{min}$, CCA ED threshold, $\tau_E$, the period for resetting the CCAT, T, and any initialization necessary to build and update table 604, are initialized. From 1004, the operations proceed to 1006, in which it is determined whether or not T time units have elapsed since the last CCAT value $\tau$ reset. In some embodiments, the reset period, T, is fixed. In other embodiments, the reset period, T, may be adapted by the AP throughout its operation. If it is determined at 1006 that T time units have elapsed since the last CCAT value $\tau$ reset (Y path), operations 1000 proceed to 1008, in which the CCAT value $\tau$ is reset to $\tau_{min}$. From 1008, operations 1000 proceed to 1010 in which the CCAT value $\tau$ is passed to the PHY later to be used for the next CCA, and operations 1000 return to 1006. Alternatively, if it is determined at 1006 that T time units have not elapsed since the last CCAT value $\tau$ reset (N path), operations 1000 proceed to 1012, in which is determined whether or not a frame has been transmitted. If it is determined at 1012 that a frame has been transmitted (Y path), operations 1000 proceed to 1014, in which the destination of the new HoL frame in the MAC queue is determined. From 1014, operations 1000 proceed to 1016 in which the MCS, $m_j$ for the new HoL frame is determined. From 1016, operations 1000 proceed to 1018, in which $p_j$, $d_j$, $r_j$, $\tau_j$, and $\tau$ are calculated and operations 1000 proceed to 1010. Alternatively, if it is determined at 1012 that a frame has not been transmitted (N path), operations 1000 proceed to 1020, in which it is determined whether or not a frame has been received. If it is determined at 1020 that a frame has not been received (N path), operations 1000 return to 1006. Alternatively, if it is determined at 1020 that a frame has been received (Y path), operations 1000 proceed to 1022 in which the frame source, STA k, is determined based on the received frame header, and operations proceed to 1024. At 1024, the average RSSI, $s_k$ for the frame source, STA k, is updated and operations 1000 return to 1006.

The example operations 1000 are illustrative of an example embodiment. Various ways to perform the illustrated operations, as well as examples of other operations that may be performed, are described herein. Further variations may be or become apparent.

Figure 11:
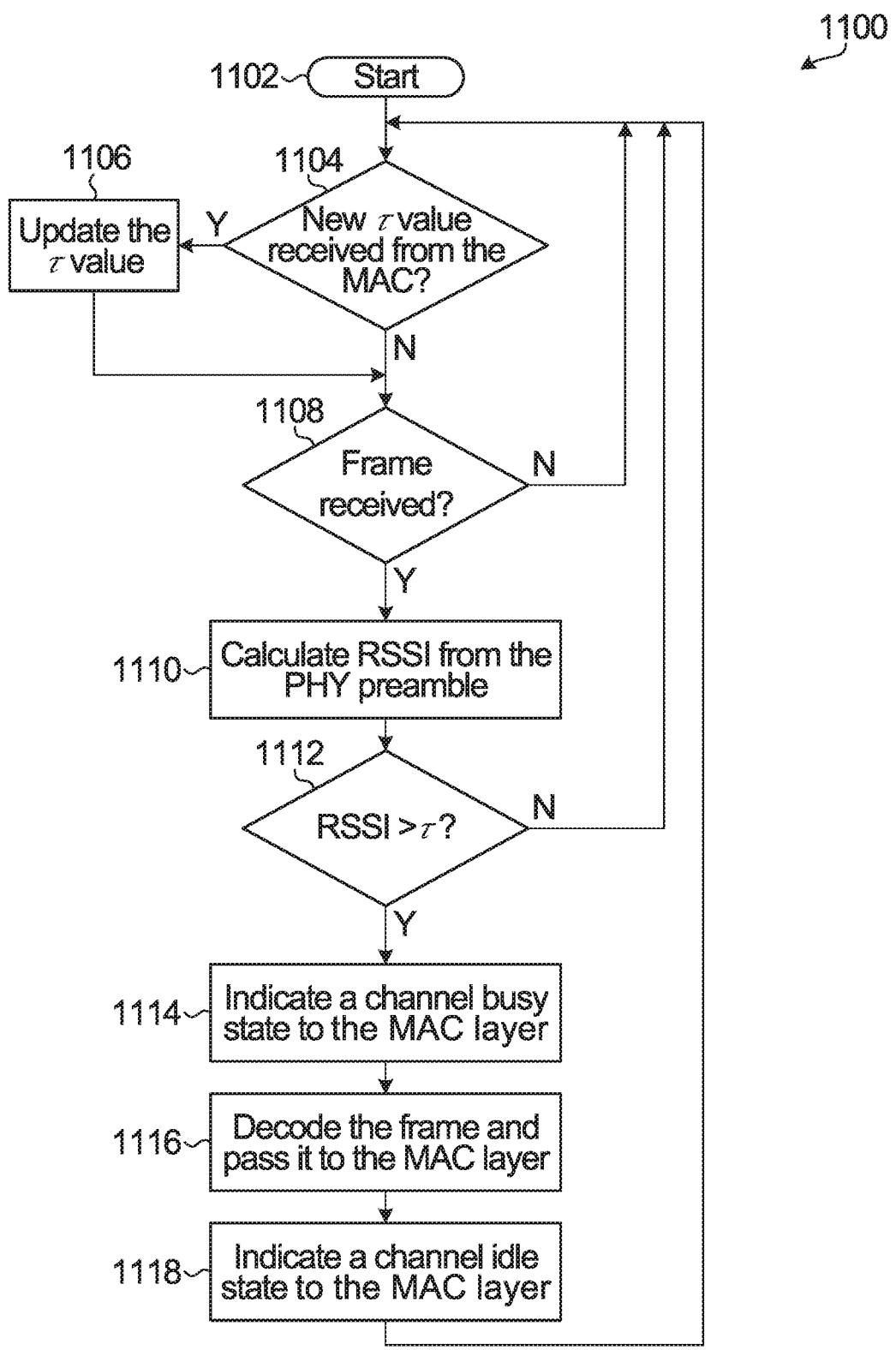
FIG. 11 is a flow diagram of example operations in the PHY layer of an AP in accordance with the second embodiment of the present disclosure.

FIG. 11 is a flow diagram of example operations 1100 in the PHY layer of an AP in accordance with the second way to protect the communication range between an AP and each STA in its BSS disclosed in the present disclosure.

Example operations 1100 start at 1102 and proceed to 1104, in which it is determined whether or not a new CCAT value $\tau$ has been received from the MAC layer. If it is determined at 1104 that a new CCAT value $\tau$ has been received from the MAC layer (Y Path), operations 1100 proceed to 1106 in which the CCAT value $\tau$ is updated. Alternatively, if it is determined at 1104 that a new CCAT value $\tau$ has not been received from the MAC layer (N path), operations 1100 proceed to 1108, in which it is determined whether a frame has been received. If it is determine at 1108 that a frame has not been received (N path), operations 1100 return to 1104. Alternatively, if it is determined at 1108 that a frame has been received (Y path), operations 1100 proceed to 1110 in which the RSSI is calculated from the PHY preamble of the received frame and operations 1100 proceed to 1112. At 1112, it is determined whether the RSSI of the received frame is greater than $\tau$. If it is determined at 1112 that the RSSI is not greater than $\tau$ (N path), operations 1100 return to 1104. Alternatively, if it is determined at 1112 that the RSSI is greater than $\tau$ (Y Path), operations 1100 proceed to 1114, in which the PHY layer indicates a channel busy state to the MAC layer and operations 1100 proceed to 1116. At 1116, the PHY layer decodes the frame, passes it to the MAC layer, and then proceeds to 1118. At 1118, the PHY layer indicates a channel idle state to the MAC layer and operations 1100 return to 1104. From this embodiment, it can be seen that the minimum CCAT $\tau$ serves as the CCAT value for frames in this embodiment and it can be periodically reset by the MAC layer.

The example operations 1100 are illustrative of an example embodiment. Various ways to perform the illustrated operations, as well as examples of other operations that may be performed, are described herein. Further variations may be or become apparent.

Simulation results for two different simulation scenarios of wireless communications networks operation in accordance with the second way to protect the communication range disclosed in the present disclosure will now be discussed with reference to FIGS. 12 to 17.

Figure 12:
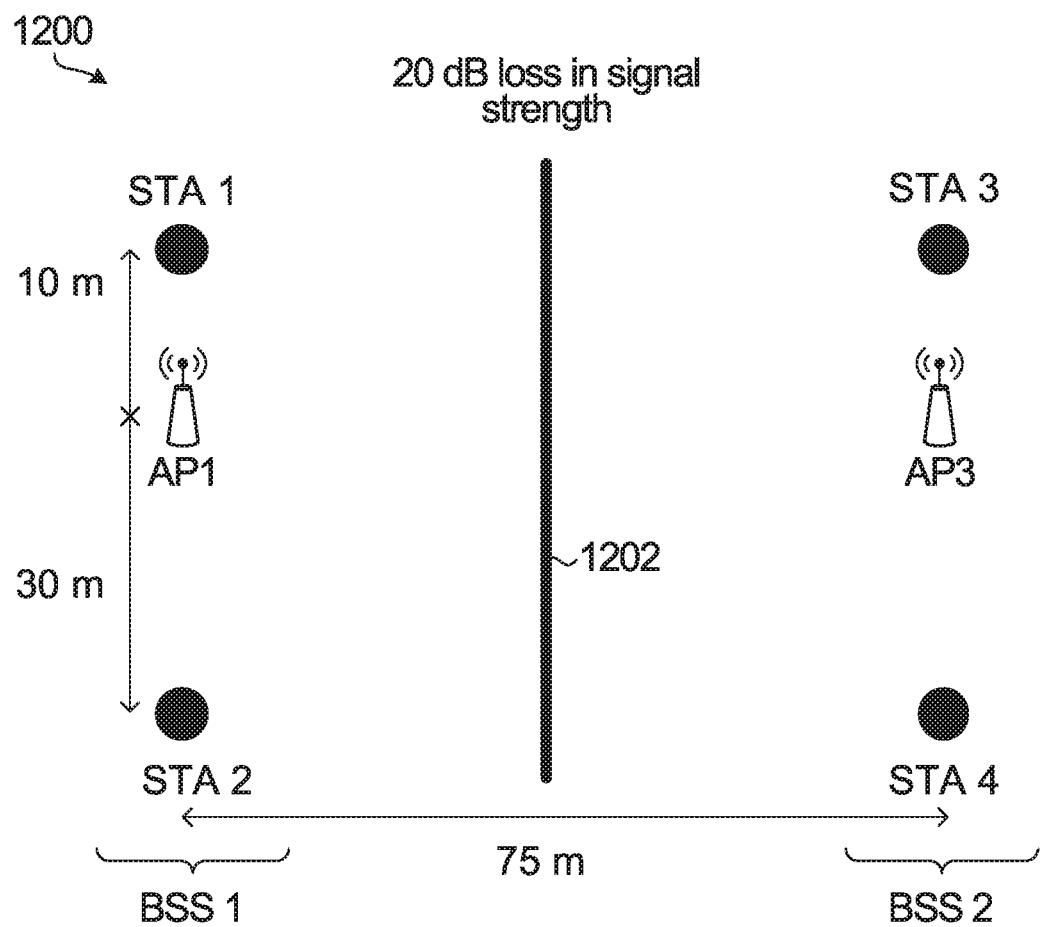
FIG. 12 is a diagram of a first simulation scenario for a wireless communications network operated in accordance with the second embodiment of the present invention in which two basic service sets (BSSs) are separated by an object causing 20 dBm loss in signal strength.

FIG. 12 is a diagram of a first simulation scenario for a wireless communications network 1200 operated in accordance with the second way to protect the communication range between an AP and each STA in its BSS disclosed in the present disclosure.

The wireless communication network 1200 includes two BSSs, BSS1 and BSS2, that are separated by a distance of 75 m with an object 1202, such as a wall, between the two BSSs that causes a 20 dBm loss in signal strength. BSS1 includes an AP, AP 1, and two STAs, STA 1 and STA 2. Similarly, BSS2 includes an AP, AP 2, and two STAs, STA 3 and STA 4.

Figure 13:
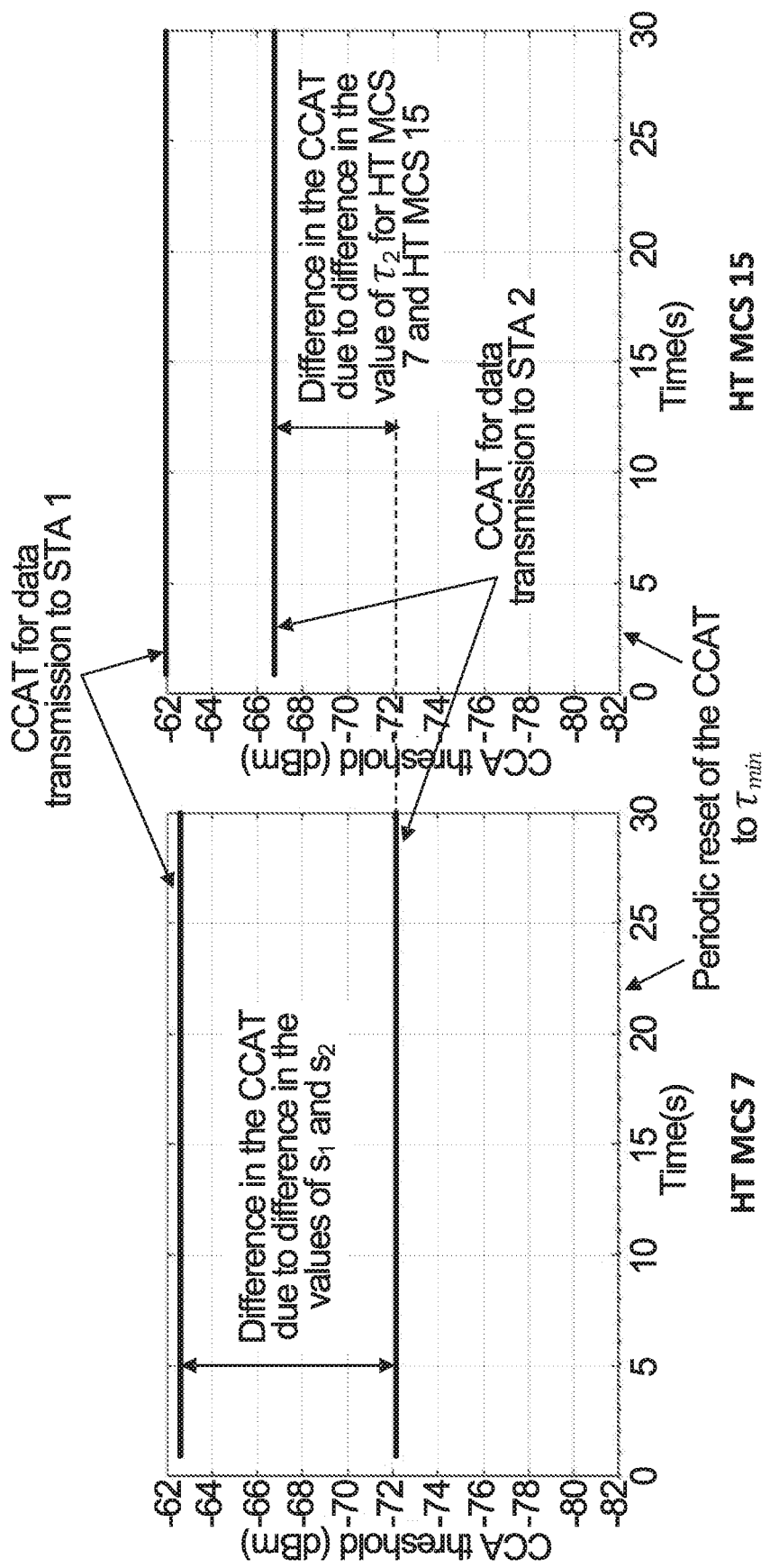
FIG. 13 shows plots of simulation results for the dynamic CCAT level for one of the APs in the first simulation scenario shown in FIG. 12 for data transmissions using high throughput (HT) MCS 7 and HT MCS 15.

FIG. 13 shows plots of simulation results for the dynamic CCAT level for AP 1 in BSS1 for the first simulation scenario shown in FIG. 12 for data transmissions to STA 1 and STA 2 using High Throughput (HT) MCS 7 and HT MCS 15. As shown in FIG. 13, the CCAT value that the AP employs for communication with STA 1 is higher than that used for communication with STA 2, due to the difference in the $s_1$ and $s_2$ values. Also, the CCAT values for data transmission to STA 1 and STA 2 are higher for HT MCS 15 than for HT MCS 7, due to the higher SINR thresholds, $t_1$ and $t_2$, that are required for successful decoding of a frame encoded with HT MCS 7.

Figure 14:
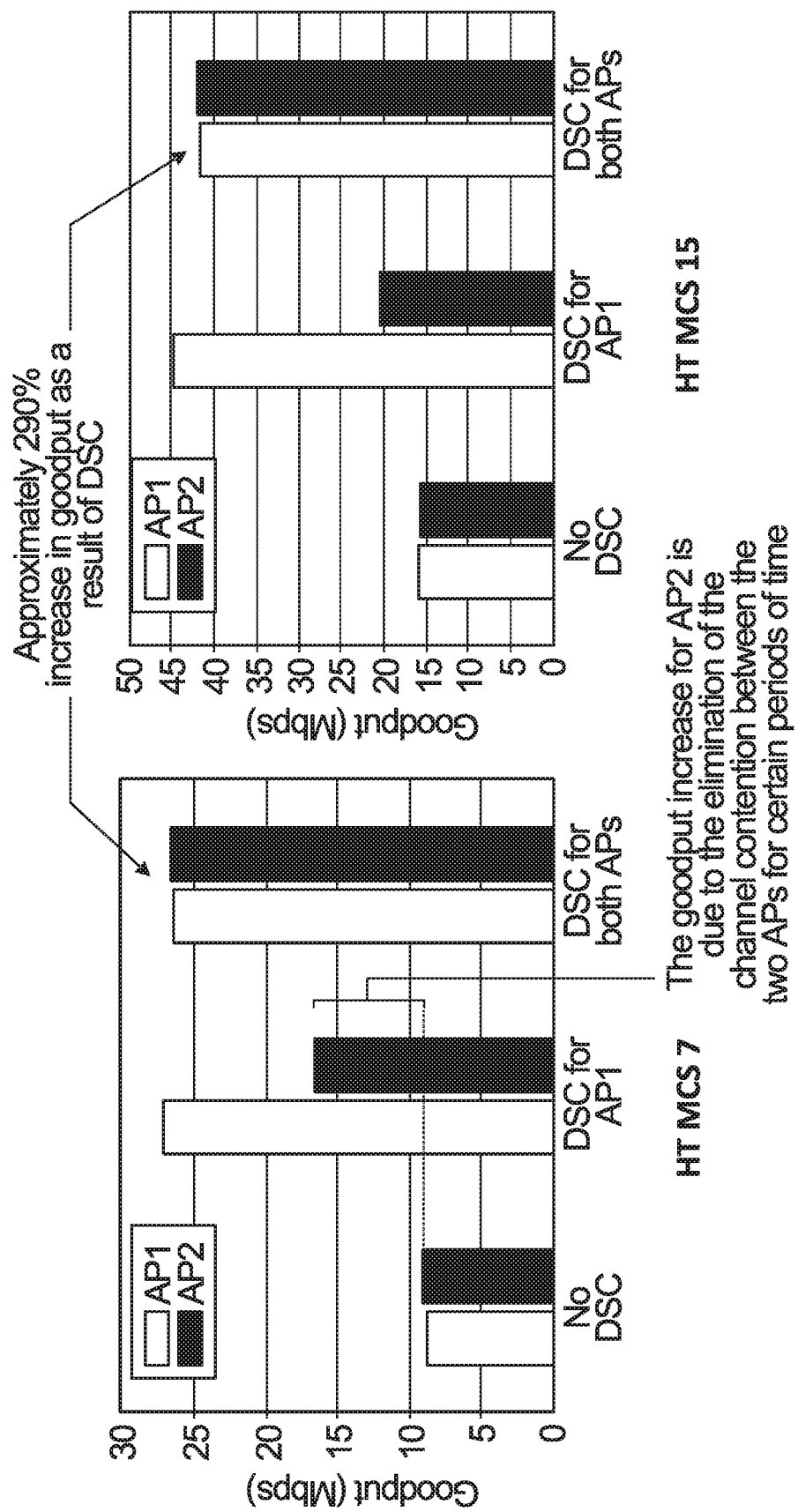
FIG. 14 shows plots of simulation results for the goodput of the two APs in the two BSSs in the first simulation scenario shown in FIG. 12 for data transmissions using HT MCS 7 and HT MCS 15.

FIG. 14 shows plots of simulation results for goodput for the two APs in the two BSSs in the first simulation scenario shown in FIG. 12 for data transmissions using HT MCS 7 and HT MCS 15 for three different scenarios: i) No DSC, ii) DSC for AP 1 only, and iii) DSC for both AP 1 and AP 2. As shown in FIG. 14, the simulation results indicate approximately a 290% increase in Goodput as a result of using DSC in both AP 1 and AP2. However, it is also noted that the simulation results indicate an increase in the Goodput of AP 2 even when DSC is done only for AP 1. The Goodput increase for AP 2 in this scenario is due to the elimination of the channel contention between the two APs for certain periods of time. This is depicted by way of example in FIG. 15, which is a timing diagram illustrating an example of the contention and transmission processes of AP 1 and AP 2 in the two BSSs shown in FIG. 12.

Figure 15:
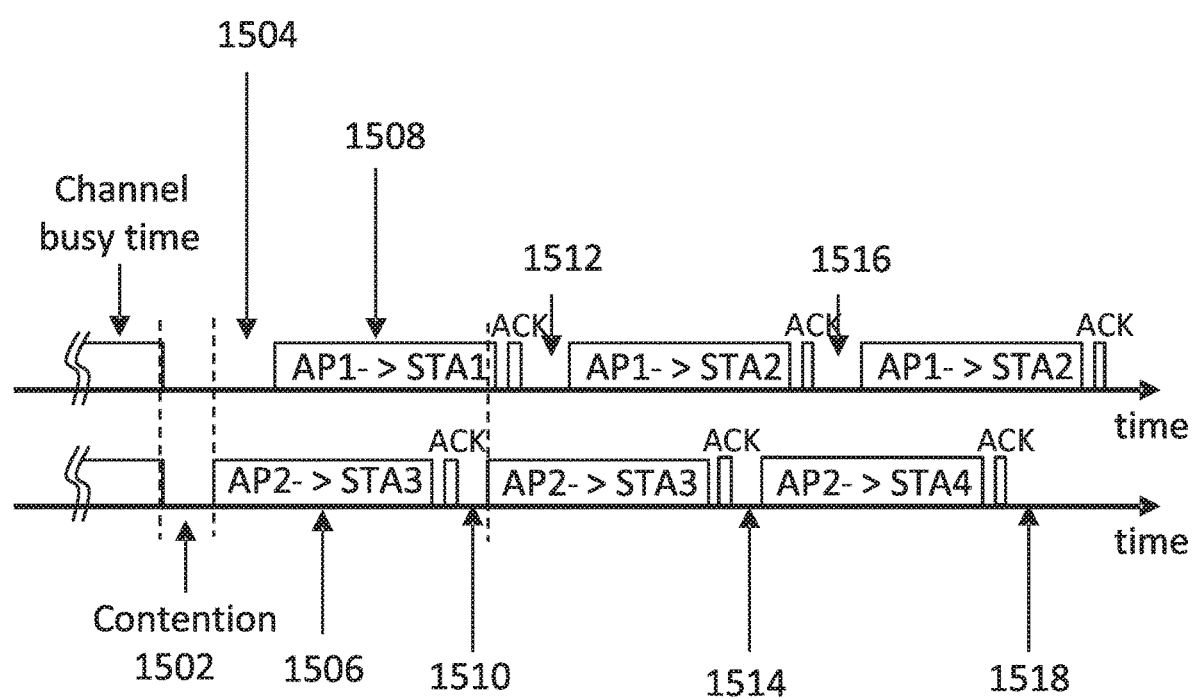
FIG. 15 is a timing diagram illustrating an example of the contention and transmission processes of the two APs in the two BSSs shown in FIG. 12 in accordance with the second embodiment of the present invention.

As shown in FIG. 15, following a channel busy time, the two APs contend for a transmission opportunity in a contention window indicated generally at 1502. In this example, AP 2 wins the contention and starts transmitting to STA 3, as generally indicated at 1506, but AP 1 later starts transmission to STA 1, as generally indicated at 1508, because AP 1 does not detect the PPDU transmitted by AP 2 to STA 3 due to a high CCAT value. In this example, the difference, generally indicated at 1504, between the start of transmission by AP 2 and the start of transmission by AP 1 may be due to a difference between the back-off times of AP 2 and AP 1, for example. At 1510, 1514 and 1518, AP 2 detects the channel as idle, because the current RSSI is compared to the CCA-ED threshold (not to the CCAT), since AP 2 did not receive the preamble of the PPDU transmitted by AP 1. Similarly, at 1512 and 1516, AP 1 compares the RSSI for the channel to the CCA-ED threshold and detects the channel as idle.

Figure 16:
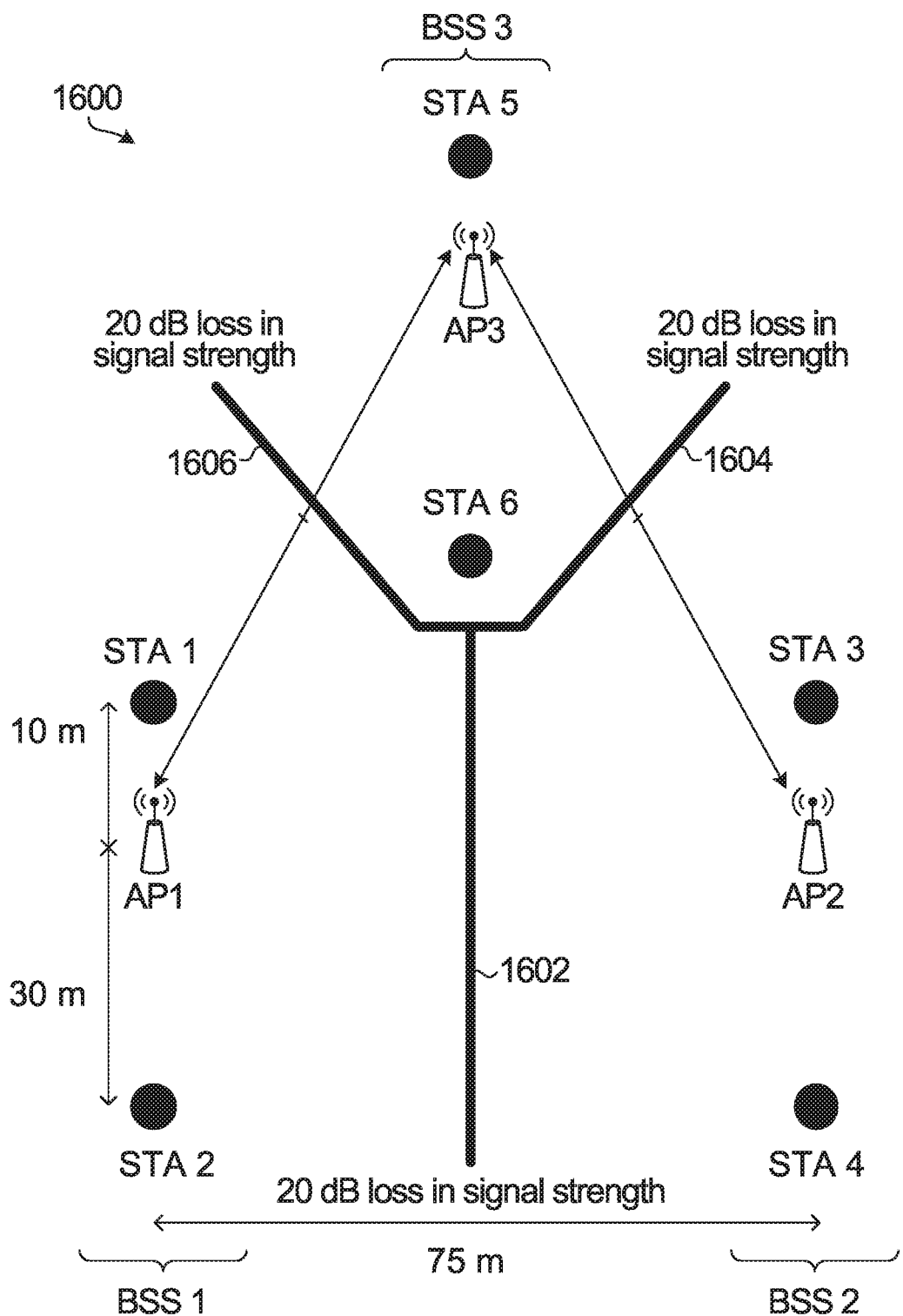
FIG. 16 is a diagram of a second simulation scenario for a wireless communications network operated in accordance with the second embodiment of the present invention in which three BSSs are each separated from one another by an object causing 20 dBm loss in signal strength.

FIG. 16 is a diagram of a second simulation scenario for a wireless communications network 1600 operated in accordance with the second way to protect the communication range between an AP and each STA in its BSS disclosed in the present disclosure.

The wireless communication network 1600 includes three BSSs, BSS1, BSS2 and BSS3 that are separated by a distance of 75 m with an object 1202, such as a wall, between each pair of BSSs that causes a 20 dBm loss in signal strength. BSS1 includes an AP, AP 1, and two STAs, STA 1 and STA 2. BSS2 includes an AP, AP 2, and two STAs, STA 3 and STA 4. BSS3 includes an AP, AP 3, and two STAs, STA 5 and STA 6.

Figure 17:
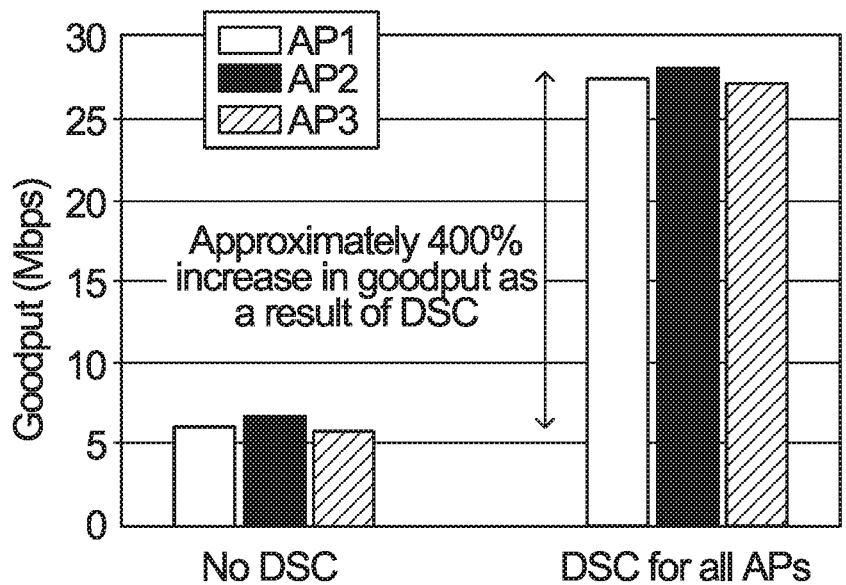
FIG. 17 shows plots of simulation results for the goodput of the three APs in the three BSSs in the second simulation scenario shown in FIG. 16 for data transmissions using HT MCS 7.

FIG. 17 shows plots of simulation results for goodput for the three APs in the three BSSs in the second simulation scenario shown in FIG. 16 for data transmissions using HT MCS 7 for two different scenarios: i) No DSC and ii) DSC for all three APs. As shown in FIG. 17, the simulation results indicate approximately a 400% increase in Goodput as a result of using DSC in the three APs.

As noted above, in some embodiments of the present invention for a HoL frame destined to the $j^{th}$ station, STA j, in an AP's BSS, the CCAT, $\tau_j$, may be determined according to:

$\tau_j = \min(\max(f_j(r_j), \tau_{min}), \tau_E), j \in \{1, \ldots, N\}$, where:

$f_j(\cdot)$ is a function that estimates an interference level at the node given an interference level at STA j;

$r_j$ is a maximum interference signal power allowed for successful capturing and decoding of the HoL frame at STA j;

$\tau_{min}$ is a minimum CCAT (e.g., the −82 dBm CCAT value defined in the IEEE 802.11 standard);

$\tau_E$ is a CCA energy detection (CCA-ED) threshold (e.g., the −62 dBm CCA-ED value defined in the IEEE 802.11 standard); and N is the number of stations in the node's BSS.

FIGS. 18A, 18B, 18C and 18D are diagrams of a wireless communications network that show an example derivation of a specific and non-limiting example of the function $f_j(\cdot)$ that may be used to estimate an interference level at the node given an interference level at STA j in accordance with an embodiment of the present disclosure.

Figure 18A:
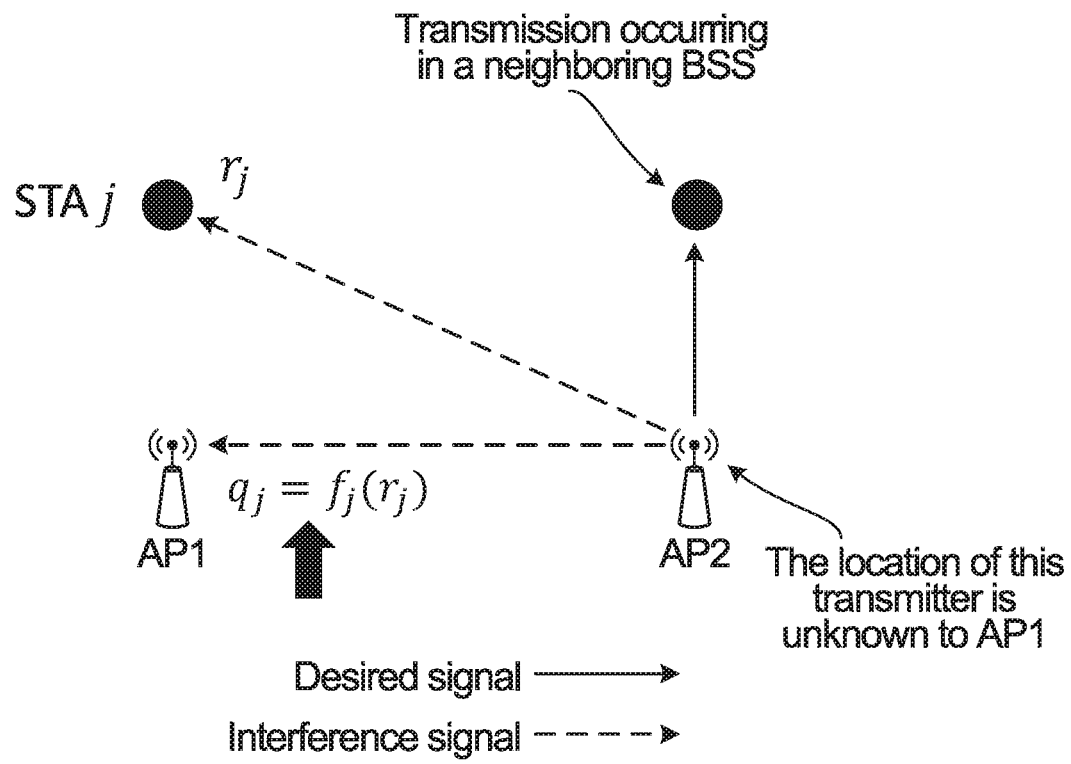
FIGS. 18A, 18B, 18C and 18D are diagrams of a wireless communications network that show an example derivation of a function that estimates the RSSI at an AP given the RSSI at a STA that is associated with the AP in accordance with an embodiment of the present disclosure.

As shown in FIG. 18A, The AP 1 determines the maximum interference signal power at STA j, denoted by $r_j$, that is allowed for successful receiving of the next PPDU transmission to STA j. Given the value of $r_j$, the goal is to determine the maximum interference signal power at the AP 1, denoted by $q_j$, that is allowed for successful receiving of the next PPDU transmission to STA j. For example, as shown in FIG. 18A, given the RSSI $r_j$ at STA j caused by a transmission occurring in a neighboring BSS, where the location of the transmitter in the neighboring BSS, i.e. AP 2, may be unknown, the challenge is to determine the RSSI $q_j$, as a function of $r_j$.

Using a log-distance path loss model for signal propagation, the receive power $P_r$ at STA j may be expressed as $$P_r = \frac{P_t}{d^\alpha},$$

where $P_t$ is transmit power, d is the distance between the transmitter and the receiver, and $\alpha$ is a path loss exponent.

Figure 18B:
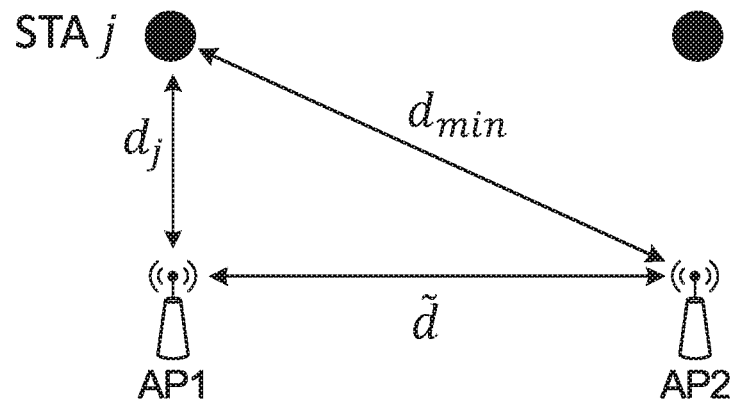

As shown in FIG. 18B, if $d_j$ denotes the distance between the AP 1 and STA j, $d_{min}$ denotes the distance between STA j and a transmitter, i.e., AP 2, that results in an RSSI that is equal to $r_j$ at STA j, and d denotes the distance between the AP 1 and a transmitter that results in an RSSI that is equal to $r_j$ at STA j, then $d_j$ and $d_{min}$ can be estimated according to:

$$d_j = \left(\frac{P_t}{s_j}\right)^{\frac{1}{\alpha}},$$

where $s_j$ denotes the average signal strength received by the AP 1 from STA j and $$d_{min} = \left(\frac{P_t}{r_j}\right)^{\frac{1}{\alpha}}.$$

Figure 18C:
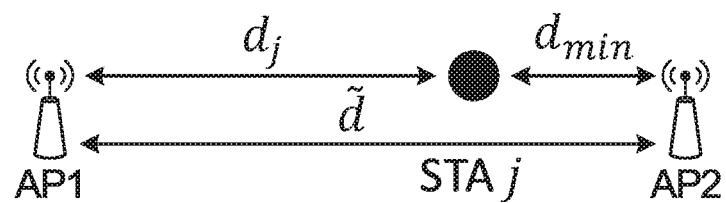
Figure 18D:
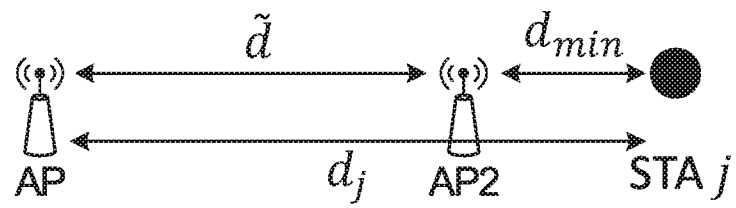

From the above estimated values of $d_j$ and $d_{min}$, the value of $\tilde{d}$ can be set in different ways, e.g., with reference to FIG. 18C:

$\tilde{d} = d_{min} + d_j$ ($\tilde{d}$ is set to its estimated maximum value)

or, with reference to FIG. 18D:

$\tilde{d} = |d_j - d_{min}|$ ($\tilde{d}$ is set to its estimated minimum value).

Given the value of $\tilde{d}$, the RSSI value $q_j$ at the AP can be estimated as follows:

$$q_j = \frac{P_t}{\tilde{d}^\alpha}.$$

Hence, the overall estimation function (assuming that the value of $\tilde{d}$ is set to its estimated maximum value) can be expressed as $$q_j = f_j(r_j) = \frac{P_t}{\left[\left(\frac{P_t}{r_j}\right)^{\frac{1}{\alpha}} + \left(\frac{P_t}{s_j}\right)^{\frac{1}{\alpha}}\right]^\alpha} = \frac{1}{\left[\left(\frac{1}{r_j}\right)^{\frac{1}{\alpha}} + \left(\frac{1}{s_j}\right)^{\frac{1}{\alpha}}\right]^\alpha}$$

$$f_j(r_j) = \frac{1}{\left(r_j^{-\frac{1}{\alpha}} + s_j^{-\frac{1}{\alpha}}\right)^\alpha}.$$

It should be appreciated that the above function is merely one example of a function for estimating an interference level at an AP given an interference level at a STA in the AP's BSS, and that other functions may be known or become known to a person of ordinary skill in the art and may be used in accordance with embodiments of the present disclosure.

Figure 19A:
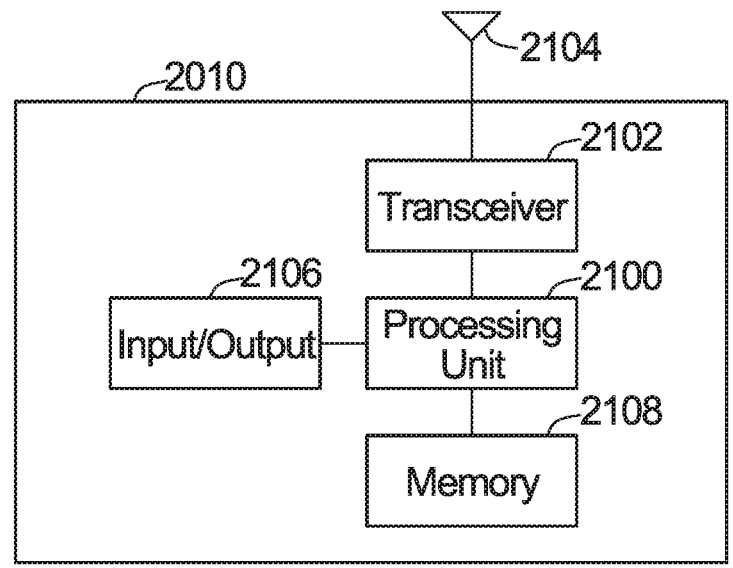
FIG. 19A is a block diagram of an example electronic device in accordance with an embodiment of the present disclosure.
Figure 19B:
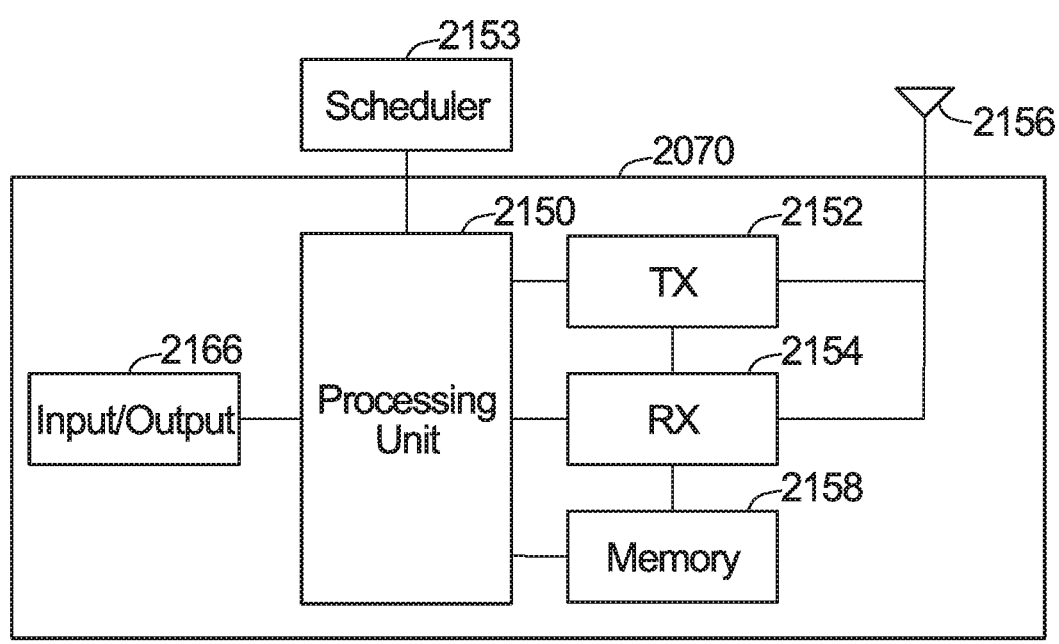
FIG. 19B is a block diagram of an example network node in accordance with an embodiment of the present disclosure.

FIGS. 19A and 19B illustrate example devices that may implement the methods and teachings according to this disclosure. In particular, FIG. 19A illustrates an example electronic device or STA 2010, and FIG. 19B illustrates an example network node 2070.

As shown in FIG. 19A, the electronic device 2010 includes at least one processing unit 2100. The processing unit 2100 implements various processing operations of the electronic device 2010. For example, the processing unit 2100 could perform signal coding, data processing, power control, input/output processing, or any other functionality enabling the electronic device 2010 to operate in the communication system 100. The processing unit 2100 may also be configured to implement some or all of the functionality and/or embodiments described in more detail above. Each processing unit 2100 includes any suitable processing or computing device configured to perform one or more operations. Each processing unit 2100 could, for example, include a microprocessor, microcontroller, digital signal processor, field programmable gate array, or application specific integrated circuit.

The electronic device 2010 also includes at least one transceiver 2102. The transceiver 2102 is configured to modulate data or other content for transmission by at least one antenna or Network Interface Controller (NIC) 2104. The transceiver 2102 is also configured to demodulate data or other content received by the at least one antenna 2104. Each transceiver 2102 includes any suitable structure for generating signals for wireless or wired transmission and/or processing signals received wirelessly or by wire. Each antenna 2104 includes any suitable structure for transmitting and/or receiving wireless or wired signals. One or multiple transceivers 2102 could be used in the electronic device 2010. One or multiple antennas 2104 could be used in the electronic device 2010. Although shown as a single functional unit, a transceiver 2102 could also be implemented using at least one transmitter and at least one separate receiver.

The electronic device 2010 further includes one or more input/output devices 2106 or interfaces (such as a wired interface to the internet 150). The input/output devices 2106 permit interaction with a user or other devices in the network. Each input/output device 2106 includes any suitable structure for providing information to or receiving information from a user, such as a speaker, microphone, keypad, keyboard, display, or touch screen, including network interface communications.

In addition, the electronic device 2010 includes at least one memory 2108. The memory 2108 stores instructions and data used, generated, or collected by the electronic device 2010. For example, the memory 2108 could store software instructions or modules configured to implement some or all of the functionality and/or embodiments described above and that are executed by the processing unit(s) 2100. Each memory 2108 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 19B, the network node 2070 includes at least one processing unit 2150, at least one transmitter 2152, at least one receiver 2154, one or more antennas 2156, at least one memory 2158, and one or more input/output devices or interfaces 2166. A transceiver, not shown, may be used instead of the transmitter 2152 and receiver 2154. A scheduler 2153 may be coupled to the processing unit 2150. The scheduler 2153 may be included within or operated separately from the network node 2070. The processing unit 2150 implements various processing operations of the network node 2070, such as signal coding, data processing, power control, input/output processing, or any other functionality. The processing unit 2150 can also be configured to implement some or all of the functionality and/or embodiments described in more detail above. Each processing unit 2150 includes any suitable processing or computing device configured to perform one or more operations. Each processing unit 2150 could, for example, include a microprocessor, microcontroller, digital signal processor, field programmable gate array, or application specific integrated circuit.

Each transmitter 2152 includes any suitable structure for generating signals for wireless or wired transmission to one or more electronic devices. Each receiver 2154 includes any suitable structure for processing signals received wirelessly or by wire from one or more electronic devices. Although shown as separate components, at least one transmitter 2152 and at least one receiver 2154 could be combined into a transceiver. Each antenna 2156 includes any suitable structure for transmitting and/or receiving wireless or wired signals. Although a common antenna 2156 is shown here as being coupled to both the transmitter 2152 and the receiver 2154, one or more antennas 2156 could be coupled to the transmitter(s) 2152, and one or more separate antennas 2156 could be coupled to the receiver(s) 2154. Each memory 2158 includes any suitable volatile and/or non-volatile storage and retrieval device(s) such as those described above in connection to the electronic device 2010. The memory 2158 stores instructions and data used, generated, or collected by the network node 2070. For example, the memory 2158 could store software instructions or modules configured to implement some or all of the functionality and/or embodiments described above and that are executed by the processing unit(s) 2150.

Each input/output device 2166 permits interaction with a user or other devices in the network. Each input/output device 2166 includes any suitable structure for providing information to or receiving/providing information from a user, including network interface communications.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding electronic devices and base stations are known to those of skill in the art. As such, these details are omitted here for clarity.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The contents of the drawings are intended solely for illustrative purposes, and the present invention is in no way limited to the particular example embodiments explicitly shown in the drawings and described herein. For example, FIGS. 2, 3, 4, 9, 12, 16 and 18 depict examples of communications networks in which embodiments may be implemented. Other embodiments could be implemented in communications networks that include more network elements and/or user devices than shown, or that have different topologies than the examples shown. Similarly, the examples in the other figures are also intended solely for illustrative purposes.

Other implementation details could also vary between different embodiments. For example, some of the examples above refer to WLAN or WiFi terminology. However, the embodiments disclosed herein are not in any way limited to WLAN or WiFi systems.

In addition, although described primarily in the context of methods and systems, other implementations are also contemplated, as instructions stored on a non-transitory processor-readable medium, for example. The instructions, when executed by one or more processors, cause the one or more processors to perform a method.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

We claim:

1. A method for dynamic sensitivity control in a node in a wireless network, the method comprising:
adapting a clear channel assessment threshold (CCAT) for a wireless medium on a frame-by-frame basis, based on a destination of a head-of-line (HoL) frame in a medium access control (MAC) layer transmission queue of the node;
determining that a received signal strength indicator (RSSI) measurement for the wireless medium is below the CCAT for the HoL frame; and
subsequent to the determining, transmitting the HoL frame over the wireless medium,
wherein adapting the CCAT on a frame-by-frame basis comprises:
given the destination of the HoL frame, calculating the CCAT as a function of:
a signal-to-interference-plus-noise ratio (SINR) threshold required for successful decoding of the HoL frame at the destination, based on a modulation and coding scheme (MCS) selection method used by the node to transmit the HoL frame;
an average received signal strength indicator (RSSI) of frames received by the node from each station included in a basic service set (BSS) of stations associated with the node; and
an estimate of a maximum interference level, at the node, that would allow for successful reception of the HoL frame at the destination.

2. The method of claim 1, wherein adapting a clear channel assessment threshold (CCAT) on a frame-by-frame basis comprises, for a HoL frame destined to the $j^{th}$ station, STA j, in the node's BSS, determining the CCAT, $\tau_j$, according to:

$$\tau_j = \min(\max(f_j(r_j), \tau_{min}), \tau_E), j \in \{1, \ldots, N\},$$

where:
$f_j(\bullet)$ is a function that estimates an interference level at the node given an interference level at STA j;
$r_j$ is a maximum interference signal power allowed for successful capturing and decoding of the HoL frame at STA j;
$\tau_{min}$ is a minimum CCAT;
$\tau_E$ is a CCA energy detection (CCA-ED) threshold; and
N is the number of stations in the node's BSS.

3. The method of claim 2, wherein the maximum interference signal power, $r_j$, allowed for successful capturing and decoding of the HoL frame at STA j is determined according to:

$$r_j = \min(p_j, d_j), j \in \{1, \ldots, N\},$$

where:
- $p_j$ is a maximum interference signal power allowed for successful capturing of the HoL frame at STA j; and
- $d_j$ is a maximum interference signal power allowed for successful decoding of the HoL frame at STA j.

4. The method of claim 3, wherein:

$$p_j = s_j - c, j \in \{1, \ldots, N\}; \text{ and}$$

$$d_j = 10\log_{10}\left(10^{\frac{s_j - t_j}{10}} - 10^{\frac{n}{10}}\right), j \in \{1, \ldots, N\},$$

where:
- $s_j$ is an average RSSI (in dBm) of frames received from STA j;
- c is a frame capture threshold, defined as the minimum ratio, in dB, between the powers of two received frames required for the receiver to capture the frame with the higher power and discard the frame with the lower power;
- $t_j$ is an SINR threshold, in dB, required for successful decoding of the HoL frame by STA j, given the MCS index, $m_j$, that will be used for the transmission of the HoL frame, as determined by an MCS selection method employed by the node; and
- n is noise power, in dBm.

5. The method of claim 2, further comprising:
using the minimum CCAT $\tau_{min}$ as a first CCAT for frames received from the node's BSS; and
using the CCAT $\tau_j$ as a second CCAT for frames received from overlapping basic service sets (OBSSs).

6. The method of claim 5, further comprising differentiating, at the MAC layer, between frames received from the node's BSS and frames received from the OBSSs.

7. The method of claim 6, further comprising, for a frame received from an OBSS:
responsive to determining, at the MAC layer, that the RSSI from the physical (PHY) layer preamble of the frame is below the second CCAT, sending a request to the PHY layer to drop a remaining portion of the frame.

8. The method of claim 7, further comprising:
responsive to receiving, at the PHY layer, the request to drop the remaining portion of the frame:
halting, at the PHY layer, reception of the remaining portion of the frame; and
sending, from the PHY layer to the MAC layer, a message indicating a channel idle state.

9. The method of claim 6, wherein the minimum CCAT $\tau_{min}$ is a fixed minimum CCAT, where $\tau_j \geq \tau_{min}$.

10. The method of claim 2, further comprising:
i) determining a CCAT value, $\tau$, to be used for an HoL frame destined to the $j^{th}$ STA, as a function of the $\tau_j$ value and the minimum average RSSI, $s_{min}$, received by the node from the N stations in the node's BSS, according to:

$$s_{min} = \min_{i=1,\ldots,N} s_i$$

$$\tau = \min(\tau_j, s_{min}), j \in \{1, \ldots, N\}; \text{ and}$$

ii) periodically resetting the CCAT value, $\tau$, to the minimum CCAT $\tau_{min}$.

11. A network node comprising:
one or more processors; and
a non-transitory computer readable storage medium storing programming for execution by the one or more processors, the programming including instructions to:
adapt a clear channel assessment threshold (CCAT) for a wireless medium on a frame-by-frame basis, based on a destination of a head-of-line (HoL) frame in a medium access control (MAC) layer transmission queue of the node;
determine that a received signal strength indicator (RSSI) measurement for the wireless medium is below the CCAT for the HoL frame; and
subsequent to the determining, transmit the HoL frame over the wireless medium,
wherein the programming includes instructions to adapt the CCAT on a frame-by-frame basis by calculating the CCAT as a function of:
a signal-to-interference-plus-noise ratio (SINR) threshold required for successful decoding of the HoL frame at the destination, based on a modulation and coding scheme (MCS) selection method used by the node to transmit the HoL frame;
an average received signal strength indicator (RSSI) of frames received by the node from each station included in a basic service set (BSS) of stations associated with the node; and
an estimate of a maximum interference level, at the node, that would allow for successful reception of the HoL frame at the destination.

12. The network node of claim 11, wherein the programming includes instructions to adapt the CCAT on a frame-by-frame basis by:
for a HoL frame destined to the $j^{th}$ station, STA j, in the node's BSS, determining the CCAT, $\tau_j$, according to:

$$\tau_j = \min(\max(f_j(r_j), \tau_{min}), \tau_E), j \in \{1, \ldots, N\},$$

where:
- $f_j(\bullet)$ is a function that estimates an interference level at the node given an interference level at STA j;
- $r_j$ is a maximum interference signal power allowed for successful capturing and decoding of the HoL frame at STA j;
- $\tau_{min}$ is a minimum CCAT;
- $\tau_E$ is a CCA energy detection (CCA-ED) threshold; and
- N is the number of stations in the node's BSS.

13. The network node of claim 12, wherein the programming includes instructions to determine the maximum interference signal power, $r_j$, allowed for successful capturing and decoding of the HoL frame at STA j according to:

$$r_j = \min(p_j, d_j), j \in \{1, \ldots, N\},$$

where:
- $p_j$ is a maximum interference signal power allowed for successful capturing of the HoL frame at STA j; and
- $d_j$ is a maximum interference signal power allowed for successful decoding of the HoL frame at STA j.

14. The network node of claim 13, wherein:

$$p_j = s_j - c, j \in \{1, \ldots, N\}; \text{ and}$$

$$d_j = 10\log_{10}\left(10^{\frac{s_j - t_j}{10}} - 10^{\frac{n}{10}}\right), j \in \{1, \ldots, N\},$$

where:
- $s_j$ is an average RSSI (in dBm) of frames received from STA j;
- c is a frame capture threshold, defined as the minimum ratio, in dB, between the powers of two received frames required for the receiver to capture the frame with the higher power and discard the frame with the lower power;
- $t_j$ is an SINR threshold, in dB, required for successful decoding of the HoL frame by STA j, given the MCS index, $m_j$, that will be used for the transmission of the HoL frame, as determined by an MCS selection method employed by the node; and
- n is noise power, in dBm.

15. The network node of claim 12, wherein the programming includes instructions to:
   use the minimum CCAT $\tau_{min}$ as a first CCAT for frames received from the node's BSS; and
   use the CCAT $\tau_j$ as a second CCAT for frames received from overlapping basic service sets (OBSSs).

16. The network node of claim 15, wherein the programming includes instructions to:
   differentiate, at the MAC layer, between frames received from the node's BSS and frames received from the OBSSs.

17. The network node of claim 16, wherein the programming includes instructions to:
   for a frame received from an OBSS, responsive to determining, at the MAC layer, that the RSSI from the physical (PHY) layer preamble of the frame is below the second CCAT, send a request to the PHY layer to drop a remaining portion of the frame.

18. The network node of claim 17, wherein the programming includes instructions to:
   responsive to receiving, at the PHY layer, the request to drop the remaining portion of the frame:
      halt, at the PHY layer, reception of the remaining portion of the frame; and
      send, from the PHY layer to the MAC layer, a message indicating a channel idle state.

19. The network node of claim 16, wherein the minimum CCAT $\tau_{min}$ is a fixed minimum CCAT, where $\tau_j \geq \tau_{min}$.

20. The network node of claim 12, wherein the programming includes instructions to:
   i) determine a CCAT value, $\tau$, to be used for an HoL frame destined to the $j^{th}$ STA, as a function of the $\tau_j$ value and the minimum average RSSI, $s_{min}$, received by the node from the N stations in the node's BSS, according to:

$s_{min} = \min_{i=1,\ldots,N} s_i$ $\tau = \min(\tau_j, s_{min}), j \in \{1, \ldots, N\}$; and ii) periodically reset the CCAT value, $\tau$, to the minimum CCAT $\tau_{min}$.

* * * * *

UNITED STATES PATENT AND TRADEMARK OFFICE
CERTIFICATE OF CORRECTION

PATENT NO. : 10,757,001 B2
APPLICATION NO. : 15/986164
DATED : August 25, 2020
INVENTOR(S) : Hassan Omar et al.

Page 1 of 1

It is certified that error appears in the above-identified patent and that said Letters Patent is hereby corrected as shown below:

In the Claims

At Column 21, Line 43, Claim 7:
"received from an OB SS:"
Should be:
-- received from an OBSS: --

At Column 21, Line 63, Claim 10:
"$S_{min} = \min_{i=1,\ldots,N} S_i$"
Should be:
-- $S_{min} = \min_{i=1,\ldots,N} S_i$ --

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*